United States Patent
Ito et al.

(10) Patent No.: US 10,831,125 B2
(45) Date of Patent: Nov. 10, 2020

(54) DEVELOPER CARRYING MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Minoru Ito, Suntou-gun (JP); Sosuke Yamaguchi, Chiba (JP); Takashi Koyanagi, Mishima (JP); Takahiro Miyazawa, Numazu (JP); Shohei Urushihara, Mishima (JP); Kentarou Nakamura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/810,451

(22) Filed: Mar. 5, 2020

(65) Prior Publication Data
US 2020/0201203 A1    Jun. 25, 2020

Related U.S. Application Data

(63) Continuation of application No. PCT/JP2018/033297, filed on Sep. 7, 2018.

(30) Foreign Application Priority Data

Sep. 11, 2017  (JP) ................................ 2017-174414
Jun. 6, 2018  (JP) ................................ 2018-108827

(51) Int. Cl.
*G03G 15/08* (2006.01)
*G03G 21/18* (2006.01)
(Continued)

(52) U.S. Cl.
CPC ......... *G03G 15/0808* (2013.01); *C08G 18/10* (2013.01); *C08G 18/4238* (2013.01);
(Continued)

(58) Field of Classification Search
CPC ............ G03G 9/0825; G03G 9/08795; G03G 9/08797; G03G 9/09364; G03G 9/09716;
(Continued)

(56) References Cited

U.S. PATENT DOCUMENTS 5,112,656 A    5/1992  Nakamura et al.
5,229,237 A    7/1993  Kawamorita et al.
(Continued)

FOREIGN PATENT DOCUMENTS

JP    H03233479 A    10/1991
JP    2013050715 A    3/2013
(Continued)

OTHER PUBLICATIONS

U.S. Appl. No. 16/838,328, Sosuke Yamaguchi, filed Apr. 2, 2020.

*Primary Examiner* — Hoan H Tran
(74) *Attorney, Agent, or Firm* — Venable LLP

(57) ABSTRACT

The developer carrying member, includes: an electroconductive substrate; and a surface layer containing a resin, on the substrate, in which a thickness of the surface layer is 1.0 μm or more and 100.0 μm or less, a Martens hardness at an indentation depth of 0.1 μm that is measured by infiltrating a Vickers indenter in a thickness direction of the surface layer from an outer surface of the surface layer is 50.0 N/mm² or more and 100.0 N/mm² or less, an Asker C hardness that is measured from the outer surface of the surface layer is 75° or more and 90° or less, and a value of a work function of the outer surface of the surface layer is 5.6 eV or more and 6.0 eV or less.

13 Claims, 4 Drawing Sheets

(51) Int. Cl.
*C08G 18/10* (2006.01)
*C08G 18/42* (2006.01)
*C08G 18/44* (2006.01)
*C08G 18/76* (2006.01)
*C09D 175/06* (2006.01)

(52) U.S. Cl.
CPC ......... *C08G 18/44* (2013.01); *C08G 18/7621* (2013.01); *C08G 18/7664* (2013.01); *C08G 18/7671* (2013.01); *C09D 175/06* (2013.01); *G03G 21/1814* (2013.01)

(58) Field of Classification Search
CPC ............... G03G 9/132; G03G 15/0808; G03G 15/1605; G03G 21/18; G03G 21/1814
USPC ........ 399/107, 110, 111, 119, 252, 265, 279, 399/286
See application file for complete search history.

(56) References Cited

U.S. PATENT DOCUMENTS

| | | | |
|---|---|---|---|
| 5,357,320 A | 10/1994 | Kashimura et al. | |
| 5,393,628 A | 2/1995 | Ikezue et al. | |
| 5,455,135 A | 10/1995 | Maruyama et al. | |
| 5,485,250 A | 1/1996 | Kashimura et al. | |
| 5,667,926 A | 9/1997 | Maruyama et al. | |
| 5,693,443 A | 12/1997 | Nakamura et al. | |
| 5,729,801 A | 3/1998 | Maruyama et al. | |
| 5,837,412 A | 11/1998 | Suzuki et al. | |
| 5,923,925 A | 7/1999 | Nakamura et al. | |
| 5,932,383 A | 8/1999 | Nakata et al. | |
| 6,016,414 A | 1/2000 | Anayama et al. | |
| 6,664,014 B1 | 12/2003 | Kikuchi et al. | |
| 6,942,952 B2 | 9/2005 | Uesugi et al. | |
| 8,059,997 B2 | 11/2011 | Otake et al. | |
| 8,372,570 B2 | 2/2013 | Matsuda et al. | |
| 8,377,549 B2 | 2/2013 | Takayama et al. | |
| 8,529,806 B2 | 9/2013 | Kawamura et al. | |
| 8,538,303 B2 | 9/2013 | Matsuda et al. | |
| 8,546,051 B2 | 10/2013 | Otake et al. | |
| 8,628,846 B2 | 1/2014 | Wakabayashi et al. | |
| 8,655,222 B2 | 2/2014 | Nakamura et al. | |
| 8,655,238 B2 | 2/2014 | Uno et al. | |
| 8,768,226 B2 | 7/2014 | Koyanagi et al. | |
| 8,768,227 B2 | 7/2014 | Urushihara et al. | |
| 8,792,810 B2 | 7/2014 | Ito et al. | |
| 8,798,508 B2 | 8/2014 | Yamada et al. | |
| 8,837,985 B2 | 9/2014 | Ishida et al. | |
| 8,846,284 B2 | 9/2014 | Kinumatsu et al. | |
| 8,846,287 B2 | 9/2014 | Yamada et al. | |
| 8,874,007 B2 | 10/2014 | Kawamura et al. | |
| 9,026,012 B2 | 5/2015 | Otake et al. | |
| 9,213,258 B2 | 12/2015 | Goto et al. | |
| 9,400,448 B2 | 7/2016 | Imanishi et al. | |
| 9,442,416 B2 | 9/2016 | Magome et al. | |
| 9,482,986 B2 * | 11/2016 | Sakurai | G03G 15/0808 |
| 9,581,931 B2 | 2/2017 | Yamada et al. | |
| 9,625,854 B2 | 4/2017 | Koyanagi et al. | |
| 9,639,009 B2 | 5/2017 | Yamaguchi et al. | |
| 9,811,009 B2 | 11/2017 | Yamada et al. | |
| 9,964,914 B2 | 5/2018 | Arimura et al. | |
| 9,977,353 B2 | 5/2018 | Nishioka et al. | |
| 9,977,359 B2 | 5/2018 | Koyanagi et al. | |
| 10,018,934 B2 | 7/2018 | Yamada et al. | |
| 10,031,438 B2 | 7/2018 | Wakabayashi et al. | |
| 10,108,129 B2 | 10/2018 | Yamaguchi et al. | |
| 10,197,930 B2 | 2/2019 | Yamada et al. | |
| 10,331,054 B2 | 6/2019 | Urushihara et al. | |
| 10,379,460 B2 | 8/2019 | Arimura et al. | |
| 10,571,825 B1 | 2/2020 | Urushihara et al. | |
| 2013/0164038 A1 | 6/2013 | Kusaba et al. | |
| 2013/0236217 A1* | 9/2013 | Nagatomo | G03G 9/08 399/281 |
| 2013/0266339 A1 | 10/2013 | Sugiyama et al. | |
| 2015/0331342 A1 | 11/2015 | Yamaguchi et al. | |
| 2015/0331346 A1 | 11/2015 | Yamauchi et al. | |
| 2016/0187808 A1 | 6/2016 | Kim | |
| 2016/0363881 A1 | 12/2016 | Urushihara et al. | |
| 2017/0139336 A1 | 5/2017 | Nagaoka et al. | |
| 2018/0217551 A1 | 8/2018 | Arimura et al. | |
| 2019/0265609 A1 | 8/2019 | Saurai et al. | |
| 2020/0041921 A1 | 2/2020 | Yamaguchi et al. | |

FOREIGN PATENT DOCUMENTS

| | | |
|---|---|---|
| JP | 2014029496 A | 2/2014 |
| JP | 2015041085 A | 3/2015 |
| JP | 2015079091 A | 4/2015 |
| JP | 2015143853 A | 8/2015 |

* cited by examiner

DEVELOPER CARRYING MEMBER, PROCESS CARTRIDGE, AND ELECTROPHOTOGRAPHIC APPARATUS

CROSS-REFERENCE TO RELATED APPLICATIONS

This application is a Continuation of International Patent Application No. PCT/JP2018/033297, filed Sep. 7, 2018, which claims the benefit of Japanese Patent Application No. 2017-174414, filed Sep. 11, 2017, and Japanese Patent Application No. 2018-108827, filed Jun. 6, 2018, all of which are hereby incorporated by reference herein in their entirety.

BACKGROUND

The present disclosure relates to a developer carrying member that is used in an electrophotographic apparatus, and a process cartridge and an electrophotographic apparatus including the developer carrying member.

DESCRIPTION OF THE RELATED ART

In an electrophotographic image forming apparatus (a copier, a facsimile, a printer, or the like using an electrophotographic method), an electrophotographic photosensitive member (hereinafter, also referred to as a "photosensitive member") is charged by a charging roller, and is exposed, and as a result thereof, an electrostatic latent image is formed on the photosensitive member. Next, a toner in a developing container is applied onto a developer carrying member by a toner-supplying roller and a toner regulating member. The toner to which an electric charge is applied, on the developer carrying member, is conveyed to a developing region. In the developing region, the electrostatic latent image on the photosensitive member is developed by the toner that is charged. After that, the toner on the photosensitive member is transferred onto a recording sheet by a transferring unit, and is fixed by heat and a pressure, and thus, an electrophotographic image is formed. In addition, a residual toner on the photosensitive member is removed from the photosensitive member by a cleaning unit.

Here, a developer carrying member including a surface layer containing a resin that has a quaternary ammonium salt group or a tertiary amine group in order to increase electric charge applying ability with respect to a toner is proposed as the developer carrying member (Japanese Patent Application Laid-Open No. 2013-50715 and Japanese Patent Application Laid-Open No. 2014-29496).

Recently, in the electrophotographic image forming apparatus, various sheets have been used. In such sheets, there is a sheet containing a large amount of inorganic compounds such as talc ($Mg_3Si_4O_{10}(OH)_2$) as a filler. Then, in a case where a talc-rich sheet is used for forming the electrophotographic image, fogging may occur in the electrophotographic image.

One aspect of the present disclosure is directed to providing a developer carrying member that is capable of stably forming a high-definition electrophotographic image with respect to various sheets. In addition, another aspect of the present disclosure is directed to providing a process cartridge that contributes to stable formation of a high-definition electrophotographic image. Further, another aspect of the present disclosure is directed to providing an electrophotographic apparatus that is capable of stably outputting a high-definition electrophotographic image.

SUMMARY

According to one aspect of the present disclosure, there is provided a developer carrying member, including: an electroconductive substrate; and a surface layer containing a resin, on the substrate, in which a thickness of the surface layer is 1.0 µm or more and 100.0 µm or less, a Martens hardness at an indentation depth of 0.1 µm that is measured by infiltrating a Vickers indenter in a thickness direction of the surface layer from an outer surface of the surface layer is 50.0 $N/mm^2$ or more and 100.0 $N/mm^2$ or less, an Asker C hardness that is measured from the outer surface of the surface layer is 75° or more and 90° or less, and a value of a work function of the outer surface of the surface layer is 5.6 eV or more and 6.0 eV or less.

In addition, according to another aspect of the present disclosure, there is provided a process cartridge configured to be detachably attachable with respect to a main body of an electrophotographic apparatus, the cartridge including at least: a toner container containing a toner; and a developer carrying member conveying the toner, in which the developer carrying member is the developer carrying member described above.

Further, according to another aspect of the present disclosure, there is provided an electrophotographic apparatus, including at least: an electrophotographic photosensitive member; a charging member disposed to be capable of charging the electrophotographic photosensitive member; and a developer carrying member supplying a toner to the electrophotographic photosensitive member, in which the developer carrying member is the developer carrying member described above.

Further features of the present disclosure will become apparent from the following description of exemplary embodiments with reference to the attached drawings.

DESCRIPTION OF THE EMBODIMENTS

Figure 1A:
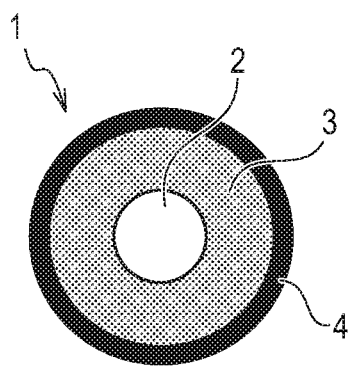
FIG. 1A is a conceptual diagram illustrating an example of a developer carrying member of the present disclosure.

The present inventors presume the reason that fogging occurs in an electrophotographic image at the time of forming the electrophotographic image on a sheet containing a large amount of talc, as follows.

In a case where an electrophotographic image is formed on the sheet containing a large amount of talc (hereinafter, referred to as a "talc-containing sheet"), talc contained in the sheet may be attached onto the surface of a photosensitive member in an electrophotographic image forming step. Then, in talc attached onto the surface of the electrophotographic photosensitive member, talc having a small particle diameter slips through a cleaning portion of the photosensitive member, and reaches a facing portion between a developer carrying member and the photosensitive member. Talc has properties of being much more easily negatively charged compared to a toner. For this reason, talc is more strongly negatively charged compared to the toner, on the developer carrying member, and is electrostatically attached onto an outer surface of the developer carrying member, and thus, the electric charge applying ability with respect to the toner of the developer carrying member decreases. As a result thereof, the toner is not capable of being sufficiently charged on the developer carrying member. Such a toner having an insufficient charge quantity is transferred onto the surface of the photosensitive member onto which the toner should not be originally transferred, and thus, fogging occurs in the electrophotographic image. Hereinafter, such fogging due to talc will be referred to as "talc derived fogging (talk derived fogging)".

A factor that causes the attachment of talc with respect to the outer surface of the developer carrying member includes electrostatic attachment and physical attachment. The attachment is rarely caused by only one of the factors, but the attachment state is changed in accordance with a change in a ratio of both of the factors. Note that, herein, the outer surface of the developer carrying member indicates a surface on a side opposite to the surface of a surface layer on a side facing the substrate.

The electrostatic attachment is a phenomenon in which talc is much more easily negatively charged compared to the toner, and thus, is more strongly negatively charged compared to the toner, on the developer carrying member, and is electrostatically attached onto the outer surface of the developer carrying member. Accordingly, the electric charge applying ability with respect to the toner of the developer carrying member is decreased. As a result thereof, as described in Japanese Patent Application Laid-Open No. 2013-50715 and Japanese Patent Application Laid-Open No. 2014-29496, in a developer carrying member in which the electric charge applying ability with respect to the toner is increased, the occurrence of the talc derived fogging is particularly remarkable. It is considered that this is because a charge quantity of talc is extremely increased by the developer carrying member. In addition, the physical attachment is a phenomenon in which talc sinks into the outer surface of the developer carrying member, and thus, is less likely to be removed. Such physical attachment is more likely to occur as a hardness that is measured on the outer surface of the developer carrying member decreases.

In the electrostatic attachment of talc with respect to the outer surface of the developer carrying member, it is effective to prevent talc from being charged by the developer carrying member. Here, the present inventors have studied a work function as one index indicating the electric charge applying ability of the outer surface of the developer carrying member study. That is, it is possible to decrease electric charge applying ability with respect to talc by increasing the work function of the outer surface of the developer carrying member. However, in a case where the work function of the outer surface is excessively high, the electric charge applying ability with respect to the toner also decreases, and in particular, there is a case where the charge quantity of the toner is not sufficient in a low temperature and low humidity environment.

Therefore, the present inventors have repeatedly studied to obtain a developer carrying member that is capable of suppressing the occurrence of the talc derived fogging while suppressing a decrease in the electric charge applying ability with respect to the toner.

As a result thereof, it has been found that a developer carrying member in which the thickness of a surface layer is 1.0 µm or more and 100.0 µm or less, and Martens hardness at an indentation depth of 0.1 µm that is measured by infiltrating a Vickers indenter in a thickness direction of the surface layer from an outer surface of the surface layer is 50.0 N/mm$^2$ or more and 100.0 N/mm$^2$ or less, and the value of a work function of the outer surface of the surface layer is 5.6 eV or more and 6.0 eV or less is effective to attain the object described above.

The work function of the outer surface of the surface layer configuring an outer surface of the developer carrying member is a parameter indicating the ease of popping out of an electron due to a photoelectric effect, and the electron is easily popping out, and an electric charge is easily applied to a toner or talc, as the value of the work function decreases. Then, in the developer carrying member according to this aspect, the work function of the outer surface of the surface layer is 5.6 eV or more and 6.0 eV or less. Accordingly, a charging polarity difference with respect to talc having a work function of 5.7 to 5.8 eV decreases, and thus, it is possible to prevent talc from being excessively charged. As a result thereof, it is possible to suppress the electrostatic attachment of talc with respect to the outer surface of the developer carrying member.

In addition, in the developer carrying member according to this aspect, the Martens hardness that is measured on the outer surface of the surface layer is 50.0 N/mm$^2$ or more and 100.0 N/mm$^2$ or less. Accordingly, even in a case where talc is attached onto the outer surface of the developer carrying member, the talc is less likely to be embedded in the surface layer and is easily peeled off, and thus, it is possible to suppress the physical attachment of talc with respect to the outer surface of the developer carrying member.

In addition, in the developer carrying member according to this aspect, the Asker C hardness that is measured from the outer surface of the surface layer is 75° or more and 90° or less. The Asker C hardness is a measurement method in which an indentation amount is large even in the case of being measured from the outer surface of the surface layer, and is capable of measuring the hardness of a position that is comparatively deep from the outer surface of the developer carrying member, unlike the Martens hardness indicating the hardness of an outermost surface region of the surface layer. Then, the Asker C hardness is 75° to 90°, and thus, in the developer carrying member according to this aspect, it is possible to prevent the toner from being deformed in a nip portion with respect to a photosensitive member. In addition, a film thickness of the surface layer of the developer carrying member according to this aspect is 1.0 µm or more and 100.0 µm or less. By setting the film thickness of the surface layer to be in such a range, it is possible to set the Asker C hardness and the Martens hardness that are measured on the outer surface of the developer carrying member to be in the numerical range described above.

Figure 1B:
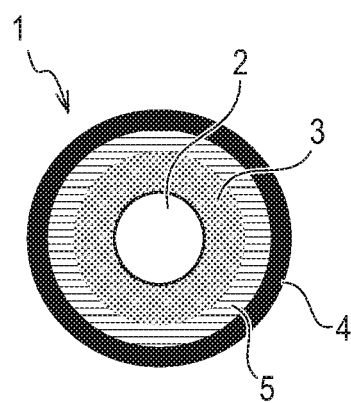
FIG. 1B is a conceptual diagram illustrating an example of the developer carrying member of the present disclosure.

A sectional view of a roller-like developer carrying member (hereinafter, also referred to as a "developing roller") according to one aspect of the present disclosure in a direction orthogonal to an axis direction is illustrated in FIG. 1A and FIG. 1B. As illustrated in FIG. 1A, a developing roller 1 includes a substrate 2 in the shape of a column or a hollow cylinder, and a surface layer 4 on the substrate, and further includes an elastic layer 3 between the substrate and the surface layer, as an option.

In addition, as illustrated in FIG. 1B, the developing roller 1 has a structure in which an interlayer 5 is further disposed between the elastic layer 3 and the surface layer 4, and a multilayer structure in which a plurality of interlayers 5 is disposed between the elastic layer 3 and the surface layer 4.

<Substrate>

The substrate functions as an electrode and a support member of the developer carrying member, and for example, is configured of a metal and an alloy such as aluminum, a copper alloy, and stainless steel; iron subjected to a plating treatment with chromium or nickel; and an electroconductive material such as a synthetic resin having electroconductivity. The substrate may be solid, or may be hollow.

<Surface Layer>

The value of the work function of the surface of the surface layer configuring the outer surface of the developer carrying member, on a side opposite to a side facing the substrate, that is, the outer surface of the surface layer is 5.6 eV or more and 6.0 eV or less. As described above, the work function of the outer surface of the surface layer is a parameter indicating the ease of emission of an electron from the outer surface. By setting the value of the work function of the outer surface is in the range described above, it is possible to prevent talc existing on the outer surface from being excessively negatively charged. On the other hand, it is possible to apply a suitable negative electric charge to the toner existing on the outer surface. As a result thereof, such a surface layer provides the developer carrying member that is capable of effectively suppressing the electrostatic attachment of the talc while having suitable electric charge applying properties with respect to the toner.

The work function of the outer surface of the surface layer, and the Martens hardness can be adjusted, for example, by containing at least one of i) and ii) described below, in the surface layer, as a binder resin.

i) Urethane Resin Having Carbonate Bond

By containing a urethane resin having a carbonate bond in the surface layer, it is possible to adjust the work function of the outer surface of the surface layer to be decreased in accordance with the presence or absence of an electron acceptable carbonyl group.

ii) Polyester Resin

By containing a polyester resin in the surface layer, it is possible to adjust the work function of the outer surface of the surface layer to be decreased in accordance with high polarity of the polyester resin.

Note that, in a case where carbon black is added to the surface layer, and electroconductivity is applied to the surface layer, it is preferable to prevent carbon black from being exposed to the outer surface of the surface layer, in order to prevent a decrease in the work function of the outer surface of the surface layer. Specifically, for example, it is preferable that an area ratio of carbon black that is exposed to the outer surface of the surface layer to a unit area (40 μm$^2$) of the outer surface (hereinafter, also referred to as an "exposure area ratio of carbon black") is 0.0% or more and 10.0% or less. In a case where the exposure area ratio of carbon black is 10.0% or less, it is possible to suppress a decrease in the work function of the outer surface due to the exposure of carbon black with respect to the outer surface of the surface layer.

Then, in order to suppress the exposure of carbon black with respect to the outer surface, it is effective to adjust the amount of carbon black in the surface layer and to improve the dispersibility of carbon black with respect to the binder resin. Specifically, the amount of carbon black is 5 to 25 mass %, and is particularly preferably 10 to 20 mass %, on the basis of the binder resin in the surface layer.

Here, in the urethane resin having a carbonate bond of i) described above, carbon black is mixed along with polyol and polyisocyanate as a raw material at the time of synthesizing the urethane resin, and thus, it is possible to excellently disperse carbon black in the urethane resin, and to attain the exposure area ratio of carbon black described above.

On the other hand, in the polyester resin of ii) described above, in general, carbon black has poor dispersibility. For this reason, in the case of using the polyester resin as the binder resin, it is preferable to use an aromatic polyester resin. It is possible to excellently disperse carbon black in the binder resin, in accordance with a mutual interaction between an aromatic ring in the molecules and an aromatic ring on the surface of carbon black. As a result thereof, the exposure of carbon black with respect to the outer surface of the surface layer is suppressed.

i) The urethane resin having a carbonate bond will be described below.

i)-1

The carbonate bond is capable of existing between two adjacent urethane bonds of the urethane resin. Insofar as both or one of polyol and polyisocyanate that are the raw material of the urethane resin have the carbonate bond, it is possible to obtain the urethane resin having a carbonate bond in the molecules.

It is preferable that the urethane resin has a structure having a carbonate bond represented by Structural Formula (1) described below, from the viewpoint of preventing the occurrence of the talc derived fogging. For this reason, the followings are presumed. In the structure represented by Structural Formula (1) described below, an alkylene group R11 is disposed around the carbonate bond. For this reason, the crystallinity around the carbonate bond decreases due to the surrounding alkylene group, and the mobility of the carbonate bond increases. As a result thereof, it is considered that an electric charge of talc that is excessively charged is easily leaked from the surface of the developing carrying member, and talc is less likely to be attached onto the surface, and thus, the talc derived fogging is suppressed.

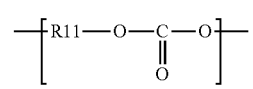

Structural Formula (1)

In Structural Formula (1), R11 is a straight-chain or branched-chain alkylene group having 3 or more and 8 or less carbon atoms, and an alkylene group having 4 or more and 8 or less carbon atoms that has a cyclic hydrocarbon structure having 4 or more and 6 or less carbon atoms.

Examples of the alkylene group as R11 are capable of including each of the following structures:

a straight-chain or branched-chain alkylene group; and an alkylene group having 4 or more and 8 or less carbon atoms that has a cyclic hydrocarbon structure having 4 or more and 6 or less carbon atoms.

More specifically, a structure represented by Structural Formula (A1) described below can be exemplified.

Structural Formula (A1):

Rc1 represents a single bond and a cyclic hydrocarbon group having 4 or more and 6 or less carbon atoms (for example, an alicyclic hydrocarbon group and an aromatic cyclic hydrocarbon group), and t1 and u1 are each independently an integer of 0 or more and 8 or less.

In a case where Rc1, for example, is a single bond, t1 and u1 satisfy a relationship of $3 \leq (t1+u1) \leq 8$.

In a case where Rc1, for example, is an alicyclic hydrocarbon group having 4 or more and 6 or less carbon atoms, the number of carbon atoms of a portion forming the alicyclic hydrocarbon structure (v1=4 to 6), and t1 and u1 satisfy a relationship of $4 \leq (t1+v1+u1) \leq 8$. In a case where Rc1, for example, is an aromatic hydrocarbon group having 4 or more and 6 or less carbon atoms, the number of carbon atoms of a portion forming the aromatic hydrocarbon structure (w1=4 to 6), and t1 and u1 satisfy a relationship of $4 \leq (t1+w1+u1) \leq 8$.

Portions represented by —(CH$_2$)t1- and —(CH$_2$)u1- may be each independently linear or branched.

i)-2

It is particularly preferable that the urethane resin has a structure represented by Structural Formula (2) described below including a unit (i) having a carbonate bond and a unit (ii) having an ester bond, in order to further suppress the talc derived fogging. The reason thereof is considered as follows. That is, the regularity of the carbonate bond according to the unit (i) is decreased, and the mobility of the carbonate bond is increased, by the ester bond according to the unit (ii). As a result thereof, it is considered that the carbonate bond more easily receives an electric charge from talc, and thus, it is possible to more excellently prevent a negative electric charge from being excessively accumulated in talc.

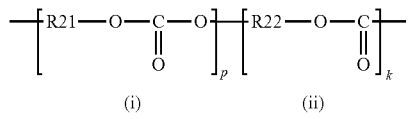

Structural Formula (2)

In Structural Formula (2), R21 represents a straight-chain or branched-chain alkylene group having 3 or more and 8 or less carbon atoms, or an alkylene group having 4 or more and 8 or less carbon atoms that has a cyclic hydrocarbon structure having 4 or more and 6 or less carbon atoms, R22 represents a straight-chain or branched-chain alkylene group having 3 or more and 8 or less carbon atoms, p is an integer of 1 or more, and k is an integer of 1 or more. In a case where p and k are 2 or more, a plurality of R21s and a plurality of R22s are each independently defined as described above.

The structure represented by Structural Formula (2) described above includes at least one of the following structures:

a structure in which the unit (i) and the unit (ii) are bonded;

a structure in which the structure in which the unit (i) and the unit (ii) are bonded is set as a repeating unit and a plurality of repeating units is bonded;

a structure in which a structure in which the unit (ii) is set as a repeating unit and a plurality of repeating units is bonded, and the unit (i) are bonded;

a structure in which a structure in which the unit (i) is set as a repeating unit and a plurality of repeating units is bonded, and the unit (ii) are bonded; and a structure in which the structure in which the unit (i) is set as the repeating unit and the plurality of repeating units is bonded, and the structure in which the unit (ii) is set as the repeating unit and the plurality of repeating units is bonded, are bonded.

In the structure represented by Structural Formula (2) described above, it is more preferable that p and k satisfy a relationship represented by Expression (I) described below.

$1.4 \leq p/k \leq 1.8$      Expression (I):

p/k indicates an abundance ratio of the carbonate bond and the ester bond in Structural Formula (2). In a case where p/k is in the range described above, it is possible to obtain a developer carrying member having a more excellent talc derived fogging prevention effect. Examples of the alkylene group as R21 are capable of including the following structures:

a straight-chain or branched-chain alkylene group; and an alkylene group having 4 or more and 8 or less carbon atoms that has a cyclic hydrocarbon structure having 4 or more and 6 or less carbon atoms.

More specifically, a structure represented by Structural Formula (A2) described below can be exemplified.

—(CH$_2$)t2-Rc2-(CH$_2$)u2-      Structural Formula (A2):

Rc2 represents a single bond or a cyclic hydrocarbon group having 4 or more and 6 or less carbon atoms (for example, an alicyclic hydrocarbon group and an aromatic cyclic hydrocarbon group), and t2 and u2 are each independently an integer of 0 or more and 8 or less.

In a case where Rc2, for example, is a single bond, t2 and u2 satisfy a relationship of $3 \leq (t2+u2) \leq 8$.

In a case where Rc2, for example, is an alicyclic hydrocarbon group having 4 or more and 6 or less carbon atoms, the number of carbon atoms of a portion forming the alicyclic hydrocarbon structure (v2=4 to 6), and t2 and u2 satisfy a relationship of $4 \leq (t2+v2+u2) \leq 8$.

In a case where Rc2, for example, is an aromatic hydrocarbon group having 4 or more and 6 or less carbon atoms, the number of carbon atoms of a portion forming the aromatic hydrocarbon structure (w2=4 to 6), and t2 and u2 satisfy a relationship of $4 \leq (t2+w2+u2) \leq 8$.

Portions represented by —(CH$_2$)t2- and —(CH$_2$)u2- may be each independently linear or branched.

i)-3

The structures described in i)-1 and i)-2 described above is a particularly preferable structure exclusively for suppressing excessive charging of talc, and is a structure that acts in a direction in which the work function of the outer surface of the surface layer is increased. On the other hand, the developer carrying member is required to have a function of applying a suitable negative electric charge to the toner. That is, in a case where the work function of the outer surface of the surface layer excessively increases, the function is not sufficiently obtained. For this reason, it is preferable that a partial structure that is capable of applying a suitable electric charge to the toner is provided in the urethane resin.

Examples of such a partial structure include a partial structure derived from a reaction between an amino compound represented by Structural Formula (3) and polyisocyanate (hereinafter, also referred to as a "partial structure A"). The urethane resin having a partial structure according to Structural Formula (3) in addition to the structures described in i)-1 described above, or i)-1 and i)-2 described above is contained in the surface layer, as a binder resin, and thus, it is more easily adjust the work function of the outer surface of the surface layer to be in a range of 5.6 eV to 6.0 eV.

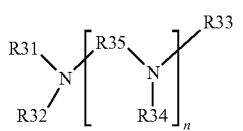

Structural Formula (3)

In Structural Formula (3), R35 represents a straight-chain or branched-chain alkylene group having 2 or more and 4 or less carbon atoms, n is an integer of 1 or more and 4 or less, and in a case where n is 2 or more and 4 or less, a plurality of R35s is each independently defined as described above.

In a case where R31 to R34 are each independently any one selected from (a) to (d) described below, and n is 2 or more and 4 or less, a plurality of R34s is each independently defined as described above, and here, in a case where n is 1, all of R31 to R34 are any one selected from (b) to (d) described below, and in a case where n is 2 or more and 4 or less, at least four of R31 to R33 and two to four R34s are any one selected from (b) to (d) described below:

(a) a hydrogen atom, or a straight-chain or branched-chain alkyl group having 1 or more and 4 or less carbon atoms;

(b) a straight-chain or branched-chain hydroxy alkyl group having 1 or more and 8 or less carbon atoms;

(c) a straight-chain or branched-chain aminoalkyl group having 2 or more and 8 or less carbon atoms; and (d) a group represented by Structural Formula (4) described below:

Structural Formula (4)

In Structural Formula (4), m is 2 or 3. A plurality of R41s each independently represents a straight-chain or branched-chain alkylene group having 2 or more and 5 or less carbon atoms.

According to such a developer carrying member, the reason that a suitable negative electric charge can be applied to the toner while an electric charge is released from talc in which a negative electric charge is accumulated is still being elucidated but is considered as follows.

That is, in the carbonate bond in the urethane resin contained in the surface layer, three oxygen atoms are bonded to one carbon atom. The oxygen atom has an electronegativity that is greater than that of the carbon atom, and thus, an electron density in the carbon atom decreases, and the carbonate bond is a functional group that easily accepts an electron (an electron acceptable functional group). For this reason, the negative electric charge in talc flows to the surface layer, and the negative electric charge in talc decreases. As a result thereof, talc that is electrostatically attached onto the developer carrying member is easily peeled off, and the amount of talc on the developer carrying member decreases, and thus, it is possible to recover a contact frequency of the developer carrying member and the toner.

In addition, the urethane resin has the partial structure derived from the reaction between the compound according to Structural Formula (3) and polyisocyanate (hereinafter, also referred to as the "partial structure A"). The partial structure A has a tertiary amine group having an unshared electron pair. The unshared electron pair has abundant electrons, and thus, functions as an electron donating functional group. As a result thereof, it is possible to apply a suitable electric charge to the toner.

Note that, it is also considered that the negative electric charge of the toner is leaked by the carbonate bond, but according to a test of the present inventors, it was obvious that the charge quantity of the toner is greatly affected by the existence of the carbonate bond in the urethane resin. From such a test result, although the reason is not obvious, but it is considered that in a case where the amount of negative electric charge in particles on the surface of the developer carrying member exceeds a certain threshold value, the carbonate bond acts to receive the electric charge from the particles.

As described above, in the surface layer having the partial structure A, an excessive negative electric charge in talc is leaked by the carbonate bond in the urethane resin contained in the surface layer, and a function of supplying a suitable negative electric charge to the toner is provided by the partial structure A.

It is preferable that the concentration of the carbonate bond in the urethane resin is 14.0 mass % or more and 23.0 mass % or less, on the basis of the mass of the urethane resin. This is because an excessive negative electric charge in talc can be excellently leaked. In addition, it is preferable that the concentration of a nitrogen atom in tertiary amine derived from the partial structure A is 1.0 mass % or more and 3.0 mass % or less, on the basis of the mass of the urethane resin. This is because negative electric charge applying ability with respect to the toner is further optimized.

The case of obtaining the urethane resin according to the present disclosure by using polyol having a carbonate bond (hereinafter, polycarbonate polyol) will be described below.

<Polycarbonate Polyol>

It is preferable that polycarbonate polyol is used by being selected from known polycarbonate polyol and polyester polycarbonate copolymerized polyol.

At least one type selected from polycarbonate diol and polycarbonate triol can be used as polycarbonate polyol. Among them, polycarbonate diol is preferable. It is preferable that examples of polycarbonate diol include polycarbonate diol in which both ends of a structure in which alkylene chains that may have a portion forming a part of a cyclic structure are repeated bonded by a carbonate bond are a hydroxyl group.

An alkylene chain represented by Structural Formula (1) and Structural Formula (2) described above is preferable as the alkylene chain that may have the portion forming a part of the cyclic structure in polycarbonate diol.

Examples of polycarbonate diol include the followings:

polynonamethylene carbonate diol, poly(2-methyl-octamethylene) carbonate diol, polyhexamethylene carbonate diol, polypentamethylene carbonate diol, poly(3-methyl pentamethylene) carbonate diol, polytetramethylene carbonate diol, polytrimethylene carbonate diol, poly(1,4-cyclohexane dimethylene carbonate) diol, poly(2-ethyl-2-butyl-trimethylene) carbonate diol, and a random/block copolymer thereof.

Examples of polyester polycarbonate copolymerized polyol include the followings:

a copolymer obtaining by polycondensing lactone such as ε-caprolactone in polycarbonate polyol described above, and a copolymer of polyester obtained by polycondensing alkanediol and a dicarboxylic acid in polycarbonate polyol described above.

Examples of alkanediol for forming such polyester are capable of including alkanediol having carbon atoms 4 to 6 such as 1,4-butanediol, 1,5-pentanediol, 1,6-hexanediol, 3-methyl pentanediol, and neopentyl glycol. It is preferable to use at least one type thereof. In addition, examples of a dicarboxylic acid are capable of including an adipic acid, a sebacic acid, a suberic acid, a glutaric acid, a pimelic acid, and the like. It is preferable to use at least one type thereof.

Polycarbonate polyol can be synthesized by a known method. For example, polycarbonate polyol can be obtained by a dehydrochlorination reaction between low-molecular-weight alcohols having 1 to 8 carbon atoms used for synthesizing polyester polyol and phosgene, or an ester exchange reaction between the low-molecular-weight alcohols and dimethyl carbonate, diethyl carbonate, diphenyl carbonate, or the like. In addition, polyester polycarbonate copolymerized polyol can be obtained by a method of allowing a carbonate compound for copolymerizing polycarbonate to react with a polyester oligomer that is obtained by a reaction between diol and a dicarboxylic acid.

Examples of diol used in this method are capable of including diol having an alkylene chain that may have a cyclic structure. Examples of the alkylene chain that may have a cyclic structure are capable of including a structure represented by R11 of Structural Formula (1) described above and R21 Structural Formula (2) described above.

Examples of diol having an alkylene chain that may have a portion forming a part of a cyclic structure are capable of including 1,3-propanediol, 1,4-butanediol, 1,6-hexanediol, 1,4-bis(hydroxy methyl) cyclohexane, 1,4-bis(hydroxy ethyl) cyclohexane 3-methyl-1,5-pentanediol, 1,4-benzene dimethanol, and 1,8-octanediol.

Such diol can be preferably used for introducing R11 of Structural Formula (1) and R21 in the unit (i) of Structural Formula (2).

Examples of the dicarboxylic acid in the method described above are capable of including an adipic acid, a sebacic acid, a suberic acid, a glutaric acid, a pimelic acid, and the like. It is preferable to use at least one type thereof.

The dicarboxylic acid can be preferably used for introducing R22 in the unit (ii) of Structural Formula (2) described above.

Carbonic ester of lower alcohol having 1 to 3 carbon atoms can be used as the carbonate compound in the method described above. Examples of such carbonic ester are capable of including dimethyl carbonate and diethyl carbonate.

It is preferable that the degree of polymerization of polyester polycarbonate copolymerized polyol is adjusted to satisfy Expression (I) described above.

<Polyisocyanate>

It is preferable to use polyisocyanate that is known for synthesizing a urethane resin, or polyisocyanate that can be used for synthesizing a urethane resin, as polyisocyanate.

Examples of polyisocyanate include an isocyanate compound, for example, aliphatic polyisocyanate such as ethylene diisocyanate and 1,6-hexamethylene diisocyanate (HDI), alicyclic polyisocyanate such as isophorone diisocyanate (IPDI), cyclohexane 1,3-diisocyanate, and cyclohexane 1,4-diisocyanate, aromatic isocyanate such as 2,4-tolylene diisocyanate, 2,6-tolylene diisocyanate (TDI), 4,4'-diphenyl methane diisocyanate (MDI), polymeric diphenyl methane diisocyanate, xylene diisocyanate, and naphthalene diisocyanate, and a copolymer or an isocyanurate product thereof, a TMP adduct product, a biuret product, and a block product. Polyisocyanate having a carbonate bond in the molecules may be used as a raw material for obtaining the urethane resin according to this aspect.

Examples of polyisocyanate having a carbonate bond in the molecules include polyisocyanate in which polycarbonate polyol or polyester polycarbonate copolymerized polyol described above is denatured by polyisocyanate described above.

<Amino Compound>

The amino compound is the compound represented by Structural Formula (3), and is one of the raw materials for forming the partial structure A according to the present disclosure.

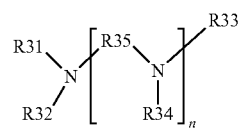

Structural Formula (3)

In Structural Formula (3), R35 represents a straight-chain or branched-chain alkylene group having 2 or more and 4 or less carbon atoms, and n is an integer of 1 or more and 4 or less. In a case where n is 2 or more and 4 or less, a plurality of R35s is each independently defined as described above.

R31 to R34 are each independently any one selected from (a) to (d) described below, and in a case where n is 2 or more and 4 or less, a plurality of R34s is each independently defined as described above. Here, in a case where n is 1, all of R31 to R34 are any one selected from (b) to (d) described below, and in a case where n is 2 or more and 4 or less, at least four of R31 to R33 and two to four R34s are any one selected from (b) to (d) described below:

(a) a hydrogen atom, or a straight-chain or branched-chain alkyl group having 1 or more and 4 or less carbon atoms;

(b) a straight-chain or branched-chain hydroxy alkyl group having 1 or more and 8 or less carbon atoms;

(c) a straight-chain or branched-chain aminoalkyl group having 2 or more and 8 or less carbon atoms; and (d) a group represented by Expression (4) described below:

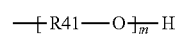

Structural Formula (4)

In Structural Formula (4), m is 2 or 3. A plurality of R41 each independently represents a straight-chain or branched-chain alkylene group having 2 or more and 5 or less carbon atoms.

Examples of (a) include a hydrogen atom, a methyl group, an ethyl group, a propyl group, and a butyl group.

Examples of (b) include a hydroxy methyl group, a hydroxy ethyl group, a hydroxy propyl group, a hydroxy butyl group, a hydroxy pentyl group, a hydroxy hexyl group, a hydroxy heptyl group, a hydroxy octyl group, and a 2-hydroxy propyl group.

Examples of (c) include an aminoethyl group, an aminopropyl group, an aminobutyl group, an aminopentyl group, an aminohexyl group, an aminoheptyl group, an aminooctyl group, and the like. Examples of R41 include an ethylene group, a propylene group, a butylene group, a pentylene group, and a 2-methyl butylene group.

Among the compounds represented by Structural Formula (3), a compound represented by Structural Formula (5) described below is particularly preferable from the viewpoint of the talc derived fogging prevention effect.

Structural Formula (5)

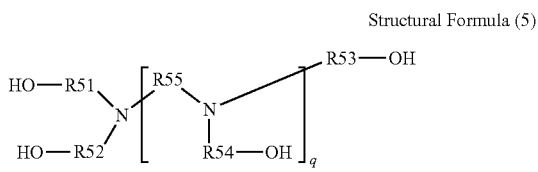

In Formula (5), R55 represents a straight-chain or branched-chain alkylene group having 2 or more and 4 or less carbon atoms, and q is an integer of 1 or more and 4 or less. In a case where q is 2 or more and 4 or less, a plurality of R55 is each independently defined as described above. R51 to R54 are each independently a straight-chain or branched-chain alkylene group having 2 or more and 5 or less carbon atoms, and in a case where q is 2 or more and 4 or less, a plurality of R54s is each independently defined as described above.

The amino compound has a functional group for reacting with polyisocyanate (a hydroxyl group or an amino group). The amino compound represented by Structural Formula (5) has a hydroxyl group. The hydroxyl group is more preferable than the amino group as the functional group of the amino compound, from the viewpoint of an effect of further suppressing the talc derived fogging.

The present inventors presume the reason as follows. This is because a bond that is obtained after the reaction with respect to polyisocyanate is different between the case of the hydroxyl group (a urethane bond) and the case of the amino group (a urea bond). In the case of the hydroxyl group, a urethane bond is formed after the reaction. The formed urethane bond forms a hydrogen bond with other urethane bonds contained in the resin, and a strong hard segment is formed around a tertiary nitrogen atom of the amino compound. In a case where the hard segment of the resin is strong, talc is less likely to be embedded in the hard segment, and an electric charge is less likely to be transferred between talc and tertiary nitrogen. As a result thereof, it is considered that talc is further prevented from being excessively charged, and a more preferable result is obtained with respect to the talc derived fogging.

<Polyol>

A material for forming a surface layer may include polyol and/or polyester polyol not having a carbonate bond, in addition to each of the materials described above. Polyol has a plurality of hydroxyl groups in the molecules, and the hydroxyl group reacts with polyisocyanate described above. Polyol not having a carbonate bond is not particularly limited, and examples thereof include polyether polyol. Examples of polyether polyol include polyethylene glycol, polypropylene glycol, and polytetramethylene glycol.

In addition, examples of polyester polyol not having a carbonate bond include a diol component such as 1,4-butanediol, 3-methyl-1,4-pentanediol, and neopentyl glycol, a triol component such as trimethylol propane, and polyester polyol obtained by a condensation reaction with respect to a dicarboxylic acid such as an adipic acid, a phthalic anhydride, a terephthalic acid, and a hexahydroxy phthalic acid. Polyether polyol and polyester polyol described above may be a prepolymer subjected to chain extension in advance by isocyanate such as 2,4-tolylene diisocyanate (TDI), 1,4diphenyl methane diisocyanate (MDI), isophorone diisocyanate (IPDI), as necessary.

In the urethane resin forming the surface layer according to this aspect, it is preferable that a ratio (L/M) of the number (L) of isocyanate groups to the number (M) of hydroxyl groups and/or amino groups is 1.0 to 2.0. The number of hydroxyl groups and/or amino groups is the sum of the hydroxyl groups of polycarbonate polyol and/or polyester polycarbonate copolymerized polyol, and the hydroxyl groups and/or the amino groups of the amino compound.

In addition, in the case of using polyol and/or polyester polyol not having a carbonate bond, the number of hydroxyl groups and/or amino groups is the sum including the number of hydroxyl groups of polyol and/or polyester polyol not having a carbonate bond. In the case of using polyol and/or polyester polyol not having a carbonate bond, it is preferable to perform compounding such that the ratio (L/M) described above is within the range described above.

General resins other than the resin according to the present disclosure, a rubber material, a compounding agent, an electroconductive applying agent, a non-electroconductive filler, a cross-linking agent, and a catalyst may be added to the surface layer, as necessary, to the extent of not impairing the effect of the present disclosure. The resin to be added is not particularly limited, and examples thereof include an epoxy resin, a urethane resin, a urea resin, an ester resin, an amide resin, an imide resin, an amide imide resin, a phenolic resin, a vinyl resin, a silicone resin, and a fluorine resin.

Examples of the rubber material include ethylene-propylene-diene copolymerized rubber, acrylonitrile-butadiene rubber, chloroprene rubber, natural rubber, isoprene rubber, styrene-butadiene rubber, silicone rubber, epichlorohydrin rubber, and urethane rubber. Examples of the compounding agent include a filler, a softener, a processing aid, a tackifier, an antitack agent, and a foaming agent that are generally used in a resin.

Carbon black; an electroconductive metal such as aluminum and copper; and fine particles of an electroconductive metal oxide such as electroconductive zinc oxide, electroconductive tin oxide, and electroconductive titanium oxide can be used as the electroconductive applying agent. Examples of the non-electroconductive filler include silica, a quartz powder, titanium oxide, or calcium carbonate. The cross-linking agent is not particularly limited, and examples thereof include tetraethoxy silane, di-t-butyl peroxide, 2,5-dimethyl-2,5-di(t-butyl peroxy) hexane, or dicumyl peroxide.

ii) Aromatic Polyester

Examples of the aromatic polyester resin include a reactant between aliphatic alcohol and at least one compound selected from the group consisting of an aromatic carboxylic acid, an aromatic carboxylic anhydride, and aromatic carboxylic ester.

Examples of aliphatic alcohol include dihydric aliphatic alcohol such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, hydrogen-added bisphenol A, and trihydric or higher aliphatic alcohol such as sorbitol, 1,2,3,6-hexane tetrol, 1,4-sorbitan, pentaerythritol, dipentaerythritol, tripentaerythritol, 1,2,4-butane triol, 1,2,5-pentane triol, glycerol, 2-methyl propane triol, 2-methyl-1,2,4-butane triol, trimethylol ethane, trimethylol propane, and 1,3,5-trihydroxy methyl benzene.

In addition, examples of the aromatic carboxylic acid include a phthalic acid, a phthalic anhydride, an isophthalic acid, and a terephthalic acid.

Note that, in a case where polyester is used as the binder resin of the surface layer and carbon black is contained in the surface layer in order to apply electroconductivity, as described above, it is preferable to decrease an exposure rate of carbon black with respect to the outer surface of the surface layer in order to increase the work function of the outer surface of the surface layer. Then, it is possible to decrease the exposure rate of carbon black with respect to the outer surface of the surface layer by increasing the dispersibility of carbon black with respect to the binder resin. Here, increasing an abundance ratio of an aromatic structure in a molecular structure of polyester is effective to increase the dispersibility of carbon black with respect to polyester.

Therefore, it is preferable to use ethylene glycol, sorbitol, and the like having many hydroxyl groups with respect to the molecular weight, as aliphatic alcohol as the raw material of aromatic polyester.

In addition, it is preferable to use at least one of an isophthalic acid and a terephthalic acid that have less steric barrier and excellent reactivity with respect to aliphatic alcohol, as aromatic carboxylic acid as the raw material of aromatic polyester.

Further, it is preferable to use a titanium-based compound such as tetraethyl titanate, tetrapropyl titanate, tetrabutyl titanate, 2-ethyl hexyl titanate, octylene glycol titanate, acetyl acetone titanate, and isostearyl titanate, as a condensation polymerization catalyst, at the time of manufacturing aromatic polyester.

In the developer carrying member according to this aspect, the Martens hardness at the indentation depth of 0.1 µm that is measured by infiltrating the Vickers indenter in the thickness direction of the surface from the outer surface of the surface layer, that is, in the direction of the substrate is 50.0 N/mm² or more and 100.0 N/mm² or less. The Martens hardness that is measured on the outer surface of the surface layer is set in such a range, and thus, it is possible to prevent talc from being embedded in the outer surface of the surface layer and to prevent the talc derived fogging while preventing the toner from being deformed in the nip portion with respect to the photosensitive member.

Then, the Martens hardness of the outer surface of the surface layer, for example, can be adjusted by selecting the binder resin in the surface layer.

Specifically, for example, in a case where the urethane resin according to i) described above is used as the binder resin, it is preferable to combine low-molecular-weight polyol and isocyanate into which a partial structure having a high hardness since the ratio of the partial structure having a high hardness in the binder resin increases. A polycarbonate structure, an acryl structure, an olefin structure, and the like are exemplified and preferably used as the partial structure having a high hardness.

In addition, in a case where aromatic polyester according to ii) described above is used as the binder resin, it is preferable that the molecular weight of aromatic polyester is 3000 or more and 15000 or less, in a chromatogram of GPC measurement, in order to set the Martens hardness at the indentation depth of 0.1 µm to be in the range. The molecular weight can be changed and controlled in accordance with a mixing ratio of materials, a reaction temperature, and time.

<Elastic Layer>

In the developer carrying member according to this aspect, the Asker C hardness that is measured from the outer surface of the surface layer is 75° or more and 90° or less. The Asker C hardness is a measurement method in which an indentation amount is large even in the case of being measured from the outer surface of the surface layer, and is capable of measuring the hardness of a position that is comparatively deep from the outer surface of the developer carrying member, unlike the Martens hardness indicating the hardness of the outermost surface region of the surface layer. Then, the Asker C hardness is 75° to 90°, and thus, in the developer carrying member according to this aspect, it is possible to prevent the toner from being deformed in the nip portion with respect to the photosensitive member.

In order to obtain a developer carrying member having such an Asker C hardness, it is preferable that the elastic layer is further provided between the substrate and the surface layer. The elastic layer as an option contributes to the formation of a wider nip in an abutting portion between the developer carrying member and the photosensitive member. The developer carrying member in which the elastic layer is provided between the substrate and the surface layer, in particular, is particularly preferably used in a contact developing type developing apparatus allowing the developer carrying member to be abutted on the photosensitive member.

Then, in the case of the developer carrying member including the elastic layer, it is preferable that the total layer thickness of all layers formed outside the substrate is 300 µm or more and 800 µm or less. This is because in a case where the layer thickness is 300 µm or more, the Asker C hardness is easily controlled such that the Asker C hardness is 90° or less.

Known materials that are used for an elastic layer, or materials that can be used for an elastic layer can be used as a material configuring the elastic layer. It is preferable that the elastic layer is formed by a molded body of a general rubber material. Examples of the rubber material include the followings:

ethylene-propylene-diene copolymerized rubber (EPDM), acrylonitrile-butadiene rubber (NBR), chloroprene rubber (CR), natural rubber (NR), isoprene rubber (IR), styrene-butadiene rubber (SBR), fluorine rubber, silicone rubber, epichlorohydrin rubber, a hydrogenated product of NBR, and urethane rubber.

Only one type of rubber materials can be used, or two or more types thereof can be used by being mixed.

Among them, in particular, silicone rubber that is less likely cause compression permanent set in the elastic layer even in a case where other members (a developer regulating blade or the like) are abutted on the elastic layer for a long period of time is preferable. Examples of silicone rubber include a hardened material of addition-curable silicone rubber, and the like. In addition, a hardened material of addition-curable dimethyl silicone rubber is particularly preferable.

In the elastic layer, various additives such as an electroconductive applying agent, a non-electroconductive filler, a cross-linking agent, and a catalyst are suitably compounded. Carbon black; an electroconductive metal such as aluminum and copper; and fine particles of an electroconductive metal oxide such as zinc oxide, tin oxide, and titanium oxide can be used as the electroconductive applying agent. At least one type of electroconductive applying agents can be used. Among them, carbon black is particularly preferable since carbon black is comparatively easily available and has excellent electroconductivity. In the case of using carbon black as the electroconductive applying agent, it is preferable that carbon black is compounded in the amount of 2 parts by mass or more and 50 parts by mass or less with respect to 100 parts by mass of the rubber material in the material for forming an elastic layer.

Examples of the non-electroconductive filler include silica, a quartz powder, titanium oxide, zinc oxide, or calcium carbonate.

Examples of the cross-linking agent include di-t-butyl peroxide, 2,5-dimethyl-2,5-di(t-butyl peroxy) hexane, or dicumyl peroxide.

In a case where surface roughness is required for the surface layer of the developer carrying member, fine particles for roughness control may be added to the surface layer. It is preferable that the fine particles for roughness control has a volume average particle diameter of 3 to 20 μm since a developer carrying member having excellent toner conveying ability can be obtained. In addition, it is preferable that the amount of fine particles added to the surface layer is 1 to 50 parts with respect to 100 parts by mass of a resin solid content of the surface layer since the effect of the present disclosure is not impaired. Fine particles of a polyurethane resin, a polyether resin, a polyamide resin, an acrylic resin, and a phenolic resin can be used in the fine particles for roughness control.

A forming method of the surface layer is not particularly limited, and the surface layer can be formed by applying a coating material for forming a surface layer onto the outer surface of the substrate or an outer surface of the elastic layer, in accordance with known coating methods such as a spraying method, a dipping method, and a roll coating method.

The developer carrying member according to one aspect of the present disclosure can be applied to any of a non-contact type developing apparatus and a contact type developing apparatus using a magnetic one-component developer or a non-magnetic one-component developer, a developing apparatus using a two-component developer, and the like.

<Process Cartridge and Electrophotographic Apparatus>

Figure 2:
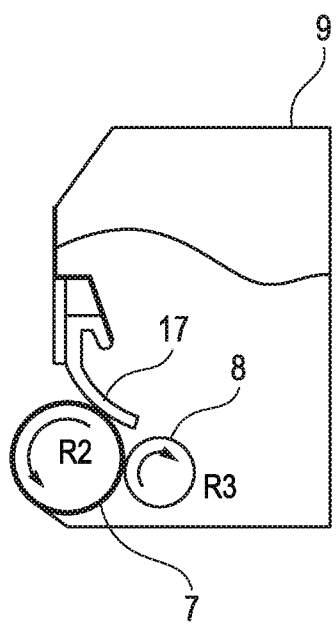
FIG. 2 is a schematic configuration diagram illustrating an example of a process cartridge of the present disclosure.
Figure 3:
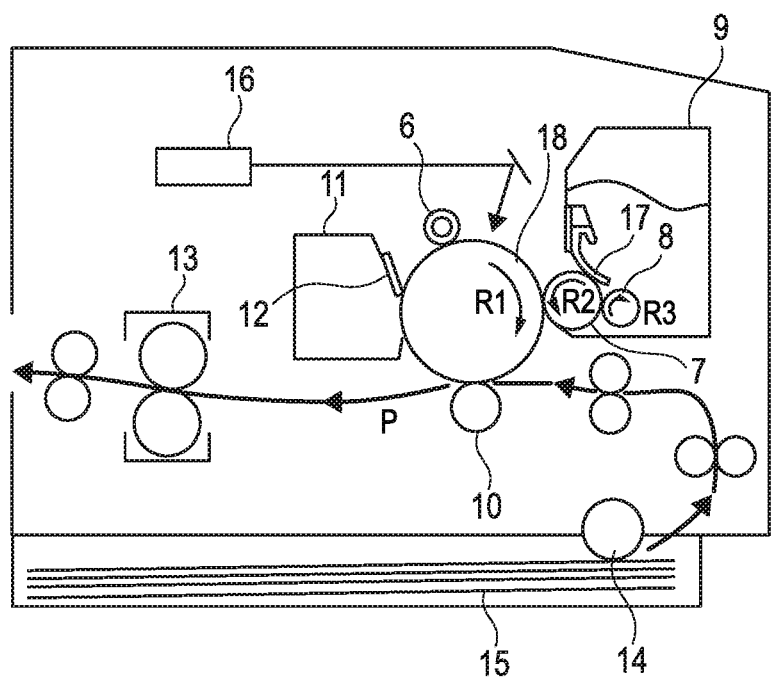
FIG. 3 is a schematic configuration diagram illustrating an example of an electrophotographic apparatus of the present disclosure.

A process cartridge according to one aspect of the present disclosure and an electrophotographic apparatus according to one aspect of the present disclosure will be described in detail by using the drawings, but the present disclosure is not limited thereto. FIG. 2 is a schematic configuration diagram illustrating an example of a process cartridge using the developer carrying member according to the present disclosure as a developing member. In addition, FIG. 3 is a schematic configuration diagram illustrating an example of an electrophotographic apparatus in which the process cartridge is embedded to be detachably attachable.

The process cartridge illustrated in FIG. 2, includes a toner container 9, a developer carrying member 7, a developer regulating member 17, and a developer supply member 8, and is detachably attachable with respect to the main body of the electrophotographic apparatus. In FIG. 3, an electrostatic latent image carrying member 18 that is an image carrying member on which an electrostatic latent image is formed is rotated in an arrow R1 direction. The developer carrying member 7 is rotated in an arrow R2 direction, and thus, conveys a developer to a developing region facing the developer carrying member 7 and the electrostatic latent image carrying member 18. In addition, the developer supply member 8 is in contact with the developer carrying member, is rotated in an R3 direction, and supplies the developer onto the surface of the developer carrying member 7.

A charging roller 6 as a charging member that is disposed to be chargeable, a transferring member (a transferring roller) 10, a cleaner container 11, a cleaning blade 12, a fixing device 13, a pickup roller 14, and the like are provided around the electrostatic latent image carrying member 18. The electrostatic latent image carrying member 18 is charged by the charging roller 6. Then, the electrostatic latent image carrying member 18 is exposed by being irradiated with laser light from the laser generating apparatus 16, and an electrostatic latent image corresponding to a target image is formed. The electrostatic latent image on the electrostatic latent image carrying member 18 is developed by the developer in the toner container 9 provided in the process cartridge as a developing device, and thus, an image is obtained. The developing device performs so-called reversal developing in which the developer is developed in an exposure unit. A transferring material (a sheet) P is conveyed into the apparatus from the sheet feeding unit 15 by the pickup roller 14 or the like, and the image is transferred onto the transferring material (the sheet) P by the transferring member (the transferring roller) 10 that is abutted on the electrostatic latent image carrying member 18 through the transferring material (the sheet) P. The transferring material (the sheet) P on which the image is formed is conveyed to the fixing device 13, and the developer is fixed onto the transferring material (the sheet) P. In addition, the developer remaining on the electrostatic latent image carrying member 18 is scraped off by the cleaning blade 12, and is contained in the cleaner container 11.

It is preferable that a developer layer thickness on the developer carrying member is regulated by abutting the developer regulating member 17 on the developer carrying member 7 through the developer. A regulating blade is general as the developer regulating member that is abutted on the developer carrying member, and can also be preferably used in the present disclosure.

A rubber elastic body such as silicone rubber, urethane rubber, and NBR; a synthetic resin elastic body such as polyethylene terephthalate, and a metal elastic body such as phosphor bronze plate and a stainless steel (SUS) plate can be used as a material configuring the regulating blade described above, and a composite body thereof may be used. Further, in order to control charging properties of the developer, a charging control material such as a resin, rubber, a metal oxide, and a metal can also be pasted to an elastic support body such as rubber, a synthetic resin, and a metal elastic body. In this case, the regulating blade is used such that the portion of the charging control material is an abutting portion with respect to the developer carrying member. A metal elastic body to which a resin or rubber is pasted is particularly preferable as such a regulating blade. Urethane rubber, a urethane resin, a polyamide resin, a nylon resin, and the like that are easily charged to positive polarity are preferable as such a resin or rubber.

EXAMPLES

Hereinafter, specific examples and comparative examples will be described. The present disclosure is not limited to such examples.

(Preparation of Elastic Roller K-1)

An aluminum cylindrical pipe subjected to grinding processing of which an outer diameter was 10 mm and arithmetic average roughness Ra was 0.2 μm was coated with a primer (Product Name: DY35-051; manufactured by Dow Corning Toray Co., Ltd.), and was baked, and thus, a substrate was obtained. The substrate was disposed in a die, and an addition type silicone rubber composition to which the following materials were mixed was injected into a cavity formed in the die.

Liquid Silicone Rubber Material (Product Name: SE6724A/B; manufactured by Dow Corning Toray Co., Ltd.) 100 parts by mass Carbon Black (Product Name: TOKABLACK #4300; manufactured by TOKAI CARBON CO., LTD.) 15 parts by mass Silica Powder (as Heat Resistance Applying Agent) 0.2 parts by mass Platinum Catalyst 0.1 parts by mass Subsequently, the die was heated, and silicone rubber was vulcanized and cured at a temperature 150° C. for 15 minutes. The substrate on which a cured silicone rubber layer was formed on the periphery was removed from the die, and then, the substrate was further heated at a temperature of 180° C. for 1 hour, and thus, a curing reaction of the silicone rubber layer was completed. As described above, an elastic roller K-1 was prepared in which a silicone rubber elastic layer having a film thickness of 0.7 mm and a diameter of 11.4 mm was formed on the outer circumference of the substrate.

(Preparation of Elastic Roller K-2)

As with the elastic roller K-1, an elastic roller K-2 was prepared in which a silicone rubber elastic layer having a film thickness of 0.3 mm and a diameter of 10.6 mm was formed on the outer circumference of the substrate.

(Preparation of Elastic Roller K-3)

As with the elastic roller K-1, an elastic roller K-3 was prepared in which a silicone rubber elastic layer having a film thickness of 0.2 mm and a diameter of 10.4 mm was formed on the outer circumference of the substrate.

(Preparation of Elastic Roller K-4)

As with the elastic roller K-1, an elastic roller K-4 was prepared in which a silicone rubber elastic layer having a film thickness 1.0 mm and a diameter of 12.0 mm was formed on the outer circumference of the substrate.

(Preparation of Raw Material for Forming Surface Layer)

<Synthesis of Isocyanate Group-Terminated Prepolymer>

A synthesis example of an isocyanate group-terminated prepolymer that is one of the raw materials for synthesizing the urethane resin in the surface layer will be described. First, raw material polyols B-1 to B-16 used for synthesizing the isocyanate group-terminated prepolymer were prepared. Commercially available products shown in Table 1 were used as raw material polyols B-1, B-6 to B-12, and B-16.

TABLE 1

| Raw material polyol No. | |
|---|---|
| B-1 | "NIPPOLLAN 982" (product name, manufactured by Tosoh Corporation) |
| B-6 | "ETERNACOLL UH-200" (product name, manufactured by Ube Industries, Ltd.) |
| B-7 | "ETERNACOLL UH-50" (product name, manufactured by Ube Industries, Ltd.) |
| B-8 | "ETERNACOLL UH-300" (product name, manufactured by Ube Industries, Ltd.) |
| B-9 | "DURANOL T5652" (product name, manufactured by Asahi Kasei Corp.) |
| B-10 | "ETERNACOLL UC-100" (product name, manufactured by Ube Industries, Ltd.) |
| B-11 | "Kuraray Polyol C1090" (product name, manufactured by Kuraray Co., Ltd.) |
| B-12 | "Kuraray Polyol C3090" (product name, manufactured by Kuraray Co., Ltd.) |
| B-16 | "NIPPOLLAN 4010" (product name, manufactured by Tosoh Corporation) |

Raw material polyols B-2 to B-5 and B-13 to B-15 were synthesized by the following method.

(Synthesis of Raw Material Polyol B-2)

100.0 g (0.50 mol) of a sebacic acid (manufactured by Tokyo Chemical Industry Co., Ltd.) as a dicarboxylic acid, 87.0 g (1.14 mol) of 1,3-propanediol (manufactured by Tokyo Chemical Industry Co., Ltd.) as diol, and 20.0 mg of a tetra-n-butyl orthotitanate tetramer (manufactured by Tokyo Chemical Industry Co., Ltd.) were put into a three-neck flask provided with a stirrer and a thermometer, and a reaction was performed at 160° C. for 4 hours in a nitrogen atmosphere. Next, a reaction liquid was cooled to 100° C. in a nitrogen atmosphere, and a pressure was decreased to 150 mmHg for 1 hour.

Subsequently, the pressure was reduced to 40 mmHg from 150 mmHg for 30 minutes, and thus, a polyester oligomer was obtained. Next, in order to copolymerize polycarbonate, 76.7 g (0.65 mol) of diethyl carbonate (manufactured by MITSUI FINE CHEMICALS, Inc.), and 1.0 mg of a zinc acetate dihydrate (manufactured by NACALAI TESQUE, INC.) were added, and a reaction was performed under a reduced pressure. The reaction was performed for 2 hours, and then, raw material polyol B-2 was obtained.

(Synthesis of Raw Material Polyols B-3 to B-5 and B-13 to B-15)

Raw material polyols B-3 to B-5 and B-13 to B-15 were synthesized as with the synthesis of raw material polyol B-2 described above, except that the raw materials used in the reaction and the mixed amount thereof were changed as shown in Table 2 described below.

TABLE 2

| Raw material polyol No. | Dicarboxylic acid | | Diol | | Diethyl carbonate |
|---|---|---|---|---|---|
| | Type | Parts by mass | Type | Parts by mass | Parts by mass |
| B-2 | Sebacic acid (manufactured by Tokyo Chemical Industry Co., Ltd.) | 100.0 | 1,3-Propanediol (manufactured by Tokyo Chemical Industry Co., Ltd.) | 87.0 | 76.7 |
| B-3 | Suberic acid (manufactured by Tokyo Chemical Industry Co., Ltd.) | 100.0 | 1,4-Butanediol (manufactured by Mitsubishi Chemical Corporation) | 135.0 | 109.2 |

TABLE 2-continued

| Raw material polyol No. | Dicarboxylic acid | | Diol | | Diethyl carbonate |
|---|---|---|---|---|---|
| | Type | Parts by mass | Type | Parts by mass | Parts by mass |
| B-4 | Sebacic acid (manufactured by Tokyo Chemical Industry Co., Ltd.) | 100.0 | 1,3-Propanediol (manufactured by Tokyo Chemical Industry Co., Ltd.) | 107.8 | 108.9 |
| B-5 | Suberic acid (manufactured by Tokyo Chemical Industry Co., Ltd.) | 100.0 | 1,4-Butanediol (manufactured by Mitsubishi Chemical Corporation) | 113.1 | 80.5 |
| B-13 | Glutaric acid (manufactured by Tokyo Chemical Industry Co., Ltd.) | 100.0 | 1,3-Propanediol (manufactured by Tokyo Chemical Industry Co., Ltd.) | 143.0 | 132.6 |
| B-14 | Sebacic acid (manufactured by Tokyo Chemical Industry Co., Ltd.) | 100.0 | 1,6-Octanediol (manufactured by Wako Pure Chemical Industries) | 161.1 | 71.8 |
| B-15 | Pimelic Acid (manufactured by Tokyo Chemical Industry Co., Ltd.) | 100.0 | 1,4-Benzene dimethanol (manufactured by Tokyo Chemical Industry Co., Ltd.) | 206.9 | 103.1 |

Structures included in raw material polyols B-1 to B-16, a hydroxyl number, and a copolymerization ratio are shown in Table 3 described below and Structural Formulas (1), (2), and (6) to (8). The copolymerization ratio was measured by an ordinary method using $^{13}$C NMR.

TABLE 3

| Raw material polyol No. | Structural formula to be included | Structure contained in molecules | | Copolymerization ratio | Hydroxyl number (mgKOH/g) |
|---|---|---|---|---|---|
| B-1 | (2) | $R21 = -(CH_2)_6-$ | $R22 = -(CH_2)_5-$ | p/k = 1.65 | 56.0 |
| B-2 | (2) | $R21 = -(CH_2)_3-$ | $R22 = -(CH_2)_8-$ | p/k = 1.55 | 55.0 |
| B-3 | (2) | $R21 = -(CH_2)_4-$ | $R22 = -(CH_2)_6-$ | p/k = 1.9 | 55.0 |
| B-4 | (2) | $R21 = -(CH_2)_3-$ | $R22 = -(CH_2)_2-$ | p/k = 2.2 | 55.0 |
| B-5 | (2) | $R21 = -(CH_2)_4-$ | $R22 = -(CH_2)_6-$ | p/k = 1.4 | 55.0 |
| B-6 | (1) | $R11 = -(CH_2)_6-$ | — | — | 56.0 |
| B-7 | (1) | $R11 = -(CH_2)_6-$ | — | — | 224.0 |
| B-8 | (1) | $R11 = -(CH_2)_6-$ | — | — | 37.0 |
| B-9 | (6) | $R61 = -(CH_2)_6-$ | $R62 = -(CH_2)_5-$ | r/s = 1.00 | 56.0 |
| B-10 | (1) | 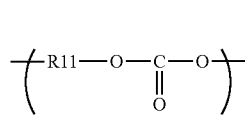 | — | — | 110.0 |
| B-11 | (6) | $R61 = -(CH_2)_2-CHCH_3-(CH_2)_2-$ | $R62 = -(CH_2)_6-$ | r/s = 9.00 | 112.0 |
| B-12 | (6) | $R61 = -(CH_2)_2-CHCH_3-(CH_2)_2-$ | $R62 = -(CH_2)_6-$ | r/s = 9.00 | 37.4 |
| B-13 | (2) | $R21 = -(CH_2)_3-$ | $R22 = -(CH_2)_3-$ | p/k = 1.75 | 56.0 |
| B-14 | (2) | $R21 = -(CH_2)_8-$ | $R22 = -(CH_2)_8-$ | p/k = 1.45 | 56.0 |
| B-15 | (7) | $R71 = -CH_2-\phantom{xx}-CH_2-$ | $R72 = -(CH_2)_4-$ | x/y = 1.65 | 56.0 |
| B-16 | (8) | $R81 = -(CH_2)_4-$ | — | — | 56.0 |

Structural Formulas (1), (2), and (6) to (8) shown in Table 3 are as follows.

Structural Formula (1)

$$\left( R11-O-\underset{\underset{O}{\|}}{C}-O \right)$$

-continued

Structural Formula (2)

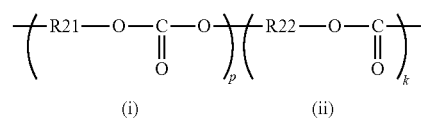

-continued

Structural Formula (6)
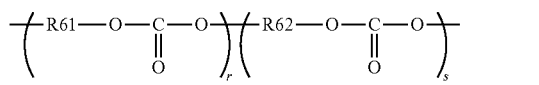

Structural Formula (7)
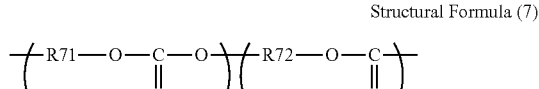

Structural Formula (8)

(Preparation of Raw Material Isocyanate)

The following commercially available products were prepared as raw material isocyanates C-1 to C-3 for preparing the following isocyanate group-terminated prepolymers by a reaction with respect to raw material polyol described above:

Raw Material Isocyanate C-1 (Pure-MDI): "MILLIONATE MT" (Product Name; manufactured by Tosoh Corporation);

Raw Material Isocyanate C-2 (Polymeric MDI): "MILLIONATE MR" (Product Name; manufactured by Tosoh Corporation); and Raw Material Isocyanate C-3 (Tolylene Diisocyanate): "COSMONATE T80" (Product Name; manufactured by Mitsui Chemicals, Inc.).

(Synthesis of Isocyanate Group-Terminated Prepolymer A-1)

30.8 parts by mass of raw material isocyanate C-1 was dissolved in methyl ethyl ketone (hereinafter, MEK) in a reaction container such that a final solid content was 50%, in a nitrogen atmosphere. After that, 100.0 parts by mass of raw material polyol B-1 was gradually dropped while the temperature in the reaction container was retained at 65° C. The dropping was ended, and then, a reaction was performed at a temperature of 65° C. for 2 hours. A reaction mixture that was obtained was cooled to a room temperature, and thus, an isocyanate group-terminated prepolymer A-1 having a solid content of 50% and an isocyanate group content of 4.7 weight % was obtained.

(Synthesis of Isocyanate Group-Terminated Prepolymers A-2 to A-25)

Isocyanate group-terminated prepolymers A-2 to A-25 were obtained as a solution having a solid content of 50%, as with the synthesis of the isocyanate group-terminated prepolymer A-1, except that the type, the mixed amount, and the reaction time of raw material polyol and raw material isocyanate used in the synthesis were changed as shown in Table 4.

TABLE 4

| Isocyanate group terminated prepolymer No. | Raw material polyol | | Raw material isocyanate | | Reaction time (h) |
|---|---|---|---|---|---|
| | No. | Parts by mass | No. | Parts by mass | |
| A-1 | B-1 | 100.0 | C-1 | 30.8 | 2.0 |
| A-2 | B-1 | 100.0 | C-1 | 37.0 | 2.5 |
| A-3 | B-1 | 100.0 | C-2 | 22.2 | 2.0 |
| A-4 | B-1 | 100.0 | C-2 | 19.7 | 1.5 |
| A-5 | B-2 | 100.0 | C-3 | 21.4 | 2.0 |
| A-6 | B-3 | 100.0 | C-3 | 21.4 | 2.0 |
| A-7 | B-4 | 100.0 | C-2 | 30.3 | 2.5 |
| A-8 | B-5 | 100.0 | C-2 | 30.3 | 2.5 |
| A-9 | B-6 | 100.0 | C-2 | 49.3 | 3.0 |
| A-10 | B-6 | 100.0 | C-2 | 61.7 | 3.0 |
| A-11 | B-6 | 100.0 | C-2 | 67.8 | 4.0 |
| A-12 | B-7 | 100.0 | C-2 | 123.3 | 4.0 |
| A-13 | B-8 | 100.0 | C-2 | 32.6 | 2.5 |
| A-14 | B-9 | 100.0 | C-2 | 49.3 | 3.0 |
| A-15 | B-10 | 100.0 | C-2 | 60.6 | 3.5 |
| A-16 | B-11 | 100.0 | C-2 | 61.7 | 3.5 |
| A-17 | B-12 | 100.0 | C-2 | 41.2 | 2.5 |
| A-18 | B-1 | 100.0 | C-2 | 18.5 | 1.5 |
| A-19 | B-1 | 100.0 | C-2 | 30.8 | 2.5 |
| A-20 | B-13 | 100.0 | C-2 | 30.8 | 4.0 |
| A-21 | B-14 | 100.0 | C-2 | 30.8 | 1.5 |
| A-22 | B-13 | 100.0 | C-2 | 30.8 | 4.0 |
| A-23 | B-15 | 100.0 | C-1 | 30.8 | 4.0 |
| A-24 | B-1 | 100.0 | C-2 | 19.7 | 3.0 |
| A-25 | B-16 | 100.0 | C-2 | 30.8 | 4.0 |

A structural formula representing the structure included in the isocyanate group-terminated prepolymer that was obtained, a carbonate bond concentration, and an isocyanate group concentration are shown in Table 5. Note that, Structural Formulas (1), (2), and (6) to (8) shown in Table 5 are identical to the structural formulas shown in Table 3. Note that, the carbonate bond concentration and the isocyanate group concentration are a value when the solid content of the isocyanate group-terminated prepolymer is set to 100 mass %.

TABLE 5

| Isocyanate group-terminated prepolymer No. | Structural formula to be included | Structure contained in molecules | | Copolymerization ratio | Isocyanate group concentration (mass %) | Carbonate bond concentration (mass %) |
|---|---|---|---|---|---|---|
| A-1 | (2) | R21 = —(CH2)6— | R22 = —(CH2)5— | p/k = 1.65 | 9.4 | 20.6 |
| A-2 | (2) | R21 = —(CH2)6— | R22 = —(CH2)5— | p/k = 1.65 | 9.5 | 19.7 |
| A-3 | (2) | R21 = —(CH2)6— | R22 = —(CH2)5— | p/k = 1.65 | 7.1 | 22.1 |
| A-4 | (2) | R21 = —(CH2)6— | R22 = —(CH2)5— | p/k = 1.65 | 9.8 | 22.6 |
| A-5 | (2) | R21 = —(CH2)3— | R22 = —(CH2)8— | p/k = 1.55 | 9.2 | 24.4 |
| A-6 | (2) | R21 = —(CH2)4— | R22 = —(CH2)6— | p/k = 1.90 | 9.3 | 26.9 |
| A-7 | (2) | R21 = —(CH2)3— | R22 = —(CH2)8— | p/k = 2.20 | 13.0 | 26.6 |
| A-8 | (2) | R21 = —(CH2)4— | R22 = —(CH2)6— | p/k = 1.40 | 13.1 | 22.2 |
| A-9 | (1) | R11 = —(CH2)6— | — | — | 14.1 | 27.9 |
| A-10 | (1) | R11 = —(CH2)6— | — | — | 14.2 | 25.7 |
| A-11 | (1) | R11 = —(CH2)6— | — | — | 9.6 | 24.8 |
| A-12 | (1) | R11 = —(CH2)6— | — | — | 13.2 | 18.6 |
| A-13 | (1) | R11 = —(CH2)6— | — | — | 11.0 | 31.4 |

TABLE 5-continued

| Isocyanate group-terminated prepolymer No. | Structural formula to be included | Structure contained in molecules | | | Copolymerization ratio | Isocyanate group concentration (mass %) | Carbonate bond concentration (mass %) |
|---|---|---|---|---|---|---|---|
| A-14 | (6) | R61 = —(CH2)6— | | R62 = —(CH2)5— | r/s = 1.00 | 13.1 | 28.9 |
| A-15 | (1) | R11 = —CH2—⟨cyclohexane⟩—CH2— | | — | — | 9.2 | 22.0 |
| A-16 | (6) | R61 = —(CH2)2—CHCH3—(CH2)2— | | R62 = —(CH2)6— | r/s = 9.00 | 8.9 | 25.7 |
| A-17 | (6) | R61 = —(CH2)2—CHCH3—(CH2)2— | | R62 = —(CH2)6— | r/s = 9.00 | 13.2 | 29.5 |
| A-18 | (2) | R21 = —(CH2)6— | | R22 = —(CH2)5— | p/k = 1.65 | 14.1 | 22.8 |
| A-19 | (2) | R21 = —(CH2)6— | | R22 = —(CH2)5— | p/k = 1.65 | 8.8 | 20.6 |
| A-20 | (2) | R21 = —(CH2)3— | | R22 = —(CH2)3— | p/k = 1.75 | 7.8 | 30.3 |
| A-21 | (2) | R21 = —(CH2)8— | | R22 = —(CH2)8— | p/k = 1.45 | 11.2 | 16.4 |
| A-22 | (2) | R21 = —(CH2)3— | | R22 = —(CH2)3— | p/k = 1.75 | 7.8 | 30.3 |
| A-23 | (7) | R71 = —CH2—⟨benzene⟩—CH2— | | R72 = —(CH2)5— | x/y = 1.65 | 7.3 | 21.7 |
| A-24 | (2) | R21 = —(CH2)6— | | R22 = —(CH2)5— | p/k = 1.65 | 7.3 | 22.6 |
| A-25 | (8) | R81 = —(CH2)4— | | — | — | 8.8 | 0.0 |

<Synthesis of Amino Compound>
(Synthesis of Amino Compound D-1)

10.0 g (0.11 mol) of 1,4-diaminobutane as a raw material amino compound, and 200 ml of pure water as a reaction solvent were heated to 40° C. while being stirred, in a reaction container provided with a stirring apparatus, a thermometer, a dropping apparatus, and a temperature adjustment apparatus. Next, 38.3 g (0.66 mol) of propylene oxide as an additive raw material was gradually dropped for 30 minutes while a reaction temperature was retained to 40° C. or lower. A reaction was performed by further performing the stirring for 2 hours, and thus, a reaction mixture was obtained. Water was distilled from the reaction mixture that under a reduced pressure, and thus, an amino compound D-1 (tetrakis(2-hydroxy propyl) butylene diamine) was obtained.
(Synthesis of Amino Compounds D-2 to D-10 and D-12 to D-14)

Amino compounds D-2 to D-10 and D-12 to D-14 were synthesized as with the amino compound D-1, except that the type and the amount of raw material amino compound and additive raw material were changed as shown in Table 6.

TABLE 6

| | Raw material amino compound | | Additive raw material compound | | |
|---|---|---|---|---|---|
| Amino compound No. | Compound name | Added amount (Parts by mass) | Compound name | Added amount (Parts by mass) | Solvent |
| D-1 | 1,4-Diaminobutane (manufactured by Tokyo Chemical Industry Co., Ltd.) | 10.0 | Propylene oxide (manufactured by NACALAI TESQUE, INC.) | 58.0 | Pure water |
| D-2 | Diethylene triamine (manufactured by Tokyo Chemical Industry Co., Ltd.) | 10.0 | Propylene oxide (manufactured by NACALAI TESQUE, INC.) | 42.2 | Pure water |
| D-3 | Diethylene triamine (manufactured by Tokyo Chemical Industry Co., Ltd.) | 10.0 | 6-Bromo-1-hexanol (manufactured by Tokyo Chemical Industry Co., Ltd.) | 131.8 | Ethanol |
| D-4 | Triethylene tetramine (manufactured by Wako Pure Chemical Industries) | 10.0 | 3-Bromo-1-propanol (manufactured by Wako Pure Chemical Industries) | 85.7 | Ethanol |
| D-5 | Triethylene tetramine (manufactured by Wako Pure Chemical Industries) | 10.0 | 8-Bromo-1-octanol (manufactured by Tokyo Chemical Industry Co., Ltd.) | 128.8 | Ethanol |
| D-6 | Triethylene tetramine (manufactured by Wako Pure Chemical Industries) | 10.0 | 2[2-(2-Chloloethoxy) ethoxy] ethanol (manufactured by Tokyo Chemical Industry Co., Ltd.) | 103.9 | Ethanol |
| D-7 | Tetraethylene pentamine (manufactured by Wako Pure Chemical Industries) | 10.0 | Propylene oxide (manufactured by NACALAI TESQUE, INC.) | 32.2 | Pure water |
| D-8 | Triethylene tetramine (manufactured by Wako Pure Chemical Industries) | 10.0 | 2-Bromo-1-ethanol (manufactured by Wako Pure Chemical Industries) | 77.1 | Ethanol |

TABLE 6-continued

| Amino compound No. | Raw material amino compound | | Additive raw material compound | | |
|---|---|---|---|---|---|
| | Compound name | Added amount (Parts by mass) | Compound name | Added amount (Parts by mass) | Solvent |
| D-9 | Triethylene tetramine (manufactured by Wako Pure Chemical Industries) | 10.0 | 4-Bromo-1-butanol (manufactured by Tokyo Chemical Industry Co., Ltd.) | 94.3 | Ethanol |
| D-10 | Ethylene diamine (manufactured by NACALAI TESQUE, INC.) | 10.0 | Paraformaldehyde (manufactured by NACALAI TESQUE, INC.) | 30.0 | Pure water |
| D-12 | Ethylene diamine (manufactured by NACALAI TESQUE, INC.) | 10.0 | 3-Bromopropyl amine hydrobromide (manufactured by Tokyo Chemical Industry Co., Ltd.) | 102.4 | Pure water |
| D-13 | Diethylene triamine (manufactured by Tokyo Chemical Industry Co., Ltd.) | 10.0 | 3-Bromopropyl amine hydrobromide (manufactured by Tokyo Chemical Industry Co., Ltd.) | 74.5 | Pure water |
| D-14 | Triethylene tetramine (manufactured by Wako Pure Chemical Industries) | 10.0 | 6-Bromohexyl amine hydrobromide (manufactured by J&K Chemical Ltd.) | 128.8 | Ethanol |

The structures of the amino compounds D-1 to D-10 and D-12 to D-14 that were obtained are shown in Structural Formula (9) and Table 7.

Structural Formula (9)

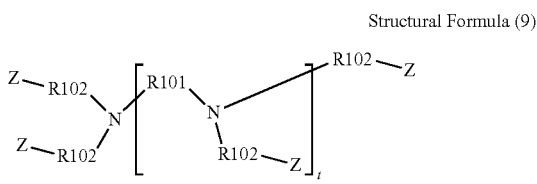

TABLE 7

| | | Amino compound | | |
|---|---|---|---|---|
| No. | t | R101 | R102 | Z |
| D-1 | 1 | —(CH2)4— | —CH2—CHCH3— | —OH |
| D-2 | 2 | —(CH2)2— | —CH2—CHCH3— | —OH |
| D-3 | 2 | —(CH2)2— | —(CH2)6— | —OH |
| D-4 | 3 | —(CH2)2— | —(CH2)3— | —OH |
| D-5 | 3 | —(CH2)2— | —(CH2)8— | —OH |
| D-6 | 3 | —(CH2)2— | —[(CH2)2O]2—(CH2)2— | —OH |
| D-7 | 4 | —(CH2)2— | —CH2—HCH3— | —OH |
| D-8 | 3 | —(CH2)2— | —(CH2)2— | —OH |
| D-9 | 3 | —(CH2)2— | —(CH2)4— | —OH |
| D-10 | 1 | —(CH2)2— | —CH2— | —OH |
| D-12 | 1 | —(CH2)2— | —(CH2)3— | —NH2 |
| D-13 | 2 | —(CH2)2— | —(CH2)3— | —NH2 |
| D-14 | 3 | —(CH2)2— | —(CH2)6— | —NH2 |

(Synthesis of Amino Compound D-11)

50.0 g (0.27 mol) of tetraethylene pentamine (manufactured by Tokyo Chemical Industry Co., Ltd.) reacted with 97.6 g (0.66 mol) of phthalic anhydride (manufactured by JFE Chemical Corporation) in chloroform, and thus, a compound was obtained in which primary amine was protected with a phthalimide group. After that, 150.3 g (1.06 mol) of iodine methane (manufactured by Tokyo Chemical Industry Co., Ltd.) was added into acetonitrile, and reflux was performed for 4 hours. After that, the obtained compound was dissolved in 500 ml of ethanol, 30.0 g (0.60 mol) of a hydrazine hydrate (manufactured by Wako Pure Chemical Industries) was added, and reflux was performed for 5 hours, and thus, a compound was obtained from which a phthalimide group was desorbed. Next, a solvent was distilled under a reduced pressure, the obtained compound was dissolved in 300 ml of ethanol, and 79.4 g (2.65 mol) of paraformaldehyde was added, and boiling point reflux was performed for 6 hours. The solvent was distilled under a reduced pressure, separating extraction and drying were performed, and then, an amino compound D-11 represented by Structural Formula (10) described below was obtained.

Structural Formula (10)

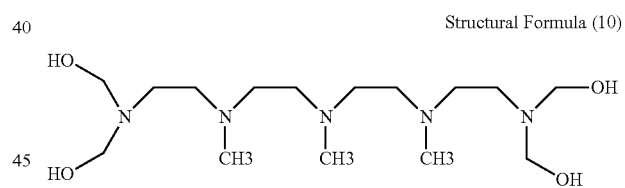

(Preparation of Polyol)

A polyol compound not having a carbonate bond shown in Table 8 described below was prepared in addition to the amino compounds described above.

TABLE 8

| No. | Product name |
|---|---|
| D-15 | Trimethylol propane (manufactured by Tokyo Chemical Industry Co., Ltd.) |
| D-16 | "Kuraray Polyol P-5010" (product name, manufactured by Kuraray Co., Ltd.) |
| D-17 | "NIPPOLLAN 4010" (product name, manufactured by Tosoh Corporation) |
| D-18 | Dipentaerythritol (manufactured by Tokyo Chemical Industry Co., Ltd.) |
| D-19 | "NIPPOLLAN 982" (product name, manufactured by Tosoh Corporation) |

Example 1

As described below, a developer carrying member according to Example 1 was prepared. The following materials were stirred and mixed as the material of the surface layer.

Reactive Compound: Isocyanate Group-Terminated Prepolymer A-1: 84.8 parts by mass Amino Compound: Amino Compound D-1: 15.2 parts by mass Carbon Black (Product Name: MA-230, manufactured by Mitsubishi Chemical Corporation): 10.0 parts by mass Urethane Resin Fine Particles (Product Name, Art Pearl C-400; manufactured by Negami Chemical Industrial Co., Ltd.): 30.0 parts by mass Next, methyl ethyl ketone was added such that the total solid content ratio was 30 mass %, and then, was mixed by a sand mill. Next, a viscosity was adjusted to 10 to 13 cps by MEK, and thus, a coating material for forming a surface layer was prepared.

The elastic roller K-1 prepared in advance was dipped in the coating material for forming a surface layer, and a coated film of the coating material was formed on the surface of the elastic layer of the elastic roller K-1, and was dried. Further, a heating treatment was performed at a temperature of 160° C. for 1 hour, and thus, a surface layer having a film thickness of approximately 15 μm was provided on the outer circumference of the elastic layer, and the developer carrying member according to Example 1 was prepared.

Examples 2 to 27

Coating materials for forming a surface layer were prepared as with Example 1, except that materials shown in Table 9 described below were used as the material of the surface layer. Then, each of the coating materials was applied onto the elastic roller K-1, and was dried and heated, as with Example 1, and thus, developer carrying members according to Examples 2 to 27 were prepared. In Example 23, polyol D-16 ("KURARAY POLYOL P-5010" (Product Name, manufactured by Kuraray Co., Ltd.) was further added in addition to the amino compound.

TABLE 9

| | Isocyanate group-terminated prepolymer | | Amino compound or polyol | |
|---|---|---|---|---|
| | No. | Parts by mass | No. | Parts by mass |
| Example 1 | A-1 | 84.8 | D-1 | 15.2 |
| Example 2 | A-2 | 87.1 | D-2 | 12.9 |
| Example 3 | A-3 | 90.0 | D-2 | 10.0 |
| Example 4 | A-4 | 83.3 | D-3 | 16.7 |
| Example 5 | A-5 | 81.6 | D-4 | 18.4 |
| Example 6 | A-6 | 70.3 | D-5 | 29.7 |
| Example 7 | A-7 | 59.1 | D-6 | 40.9 |
| Example 8 | A-8 | 75.1 | D-7 | 24.9 |
| Example 9 | A-9 | 71.0 | D-7 | 29.0 |
| Example 10 | A-10 | 75.1 | D-2 | 24.9 |
| Example 11 | A-11 | 92.1 | D-2 | 7.9 |
| Example 12 | A-12 | 67.9 | D-3 | 32.1 |
| Example 13 | A-13 | 85.1 | D-3 | 14.9 |
| Example 14 | A-14 | 79.0 | D-8 | 21.0 |
| Example 15 | A-15 | 86.9 | D-4 | 13.1 |
| Example 16 | A-16 | 85.5 | D-9 | 14.5 |
| Example 17 | A-17 | 75.0 | D-7 | 25.0 |
| Example 18 | A-18 | 71.0 | D-7 | 29.0 |
| Example 19 | A-19 | 92.4 | D-2 | 7.6 |
| Example 20 | A-20 | 90.5 | D-10 | 9.5 |
| Example 21 | A-21 | 77.0 | D-2 | 23.0 |
| Example 22 | A-22 | 84.9 | D-11 | 15.1 |

TABLE 9-continued

| | Isocyanate group-terminated prepolymer | | Amino compound or polyol | |
|---|---|---|---|---|
| | No. | Parts by mass | No. | Parts by mass |
| Example 23 | A-19 | 42.1 | D-2 | 3.2 |
| | | | D-16 | 54.7 |
| Example 24 | A-1 | 88.0 | D-12 | 12.0 |
| Example 25 | A-1 | 82.0 | D-2 | 18.0 |
| Example 26 | A-1 | 70.1 | D-13 | 29.9 |
| Example 27 | A-23 | 75.1 | D-13 | 24.9 |

Comparative Example 1

92.8 parts by mass of the isocyanate group-terminated prepolymer A-19, 10.0 parts by mass of carbon black (Product Name: MA-230, manufactured by Mitsubishi Chemical Corporation), and 30.0 parts by mass of urethane resin fine particles (Product Name: Art Pearl C-400; manufactured by Negami Chemical Industrial Co., Ltd.) were stirred and mixed with respect to 7.2 parts by mass of polyol D-15, as the material of the surface layer.

Hereinafter, a coating material for forming a surface layer according to Comparative Example 1 was prepared as with the preparation method of the coating material for forming a surface layer according to Example 1. The coating material for forming a surface layer was applied onto the surface of the silicone rubber elastic layer of the elastic roller K-1, and was dried, and the surface layer was formed, and thus, a developer carrying member of Comparative Example 1 was prepared, as with Example 1.

Comparative Examples 2 to 8

Coating materials for forming a surface layer were prepared as with Comparative Example 1, except that materials shown in Table 10 described below were used as the material of the surface layer. Then, each of the coating materials was applied onto the elastic roller, and was dried and heated, as with Comparative Example 1, and thus, developer carrying members according to Comparative Examples 2 to 8 were prepared. Note that, in Comparative Example 6, an amino compound D-2 was used instead of polyol.

TABLE 10

| | Isocyanate group-terminated prepolymer | | Amino compound or polyol | |
|---|---|---|---|---|
| | No. | Parts by mass | No. | Parts by mass |
| Comparative Example 1 | A-19 | 92.8 | D-15 | 7.2 |
| Comparative Example 2 | A-24 | 31.1 | D-16 | 68.9 |
| Comparative Example 3 | A-19 | 36.4 | D-17 | 63.6 |
| Comparative Example 4 | A-19 | 93.1 | D-18 | 6.9 |
| Comparative Example 5 | A-19 | 36.4 | D-19 | 63.6 |
| Comparative Example 6 | A-25 | 87.9 | D-2 | 12.1 |
| Comparative Example 7 | A-25 | 92.8 | D-15 | 7.2 |
| Comparative Example 8 | A-25 | 93.1 | D-18 | 6.9 |

Examples 28 and 29

Developer carrying members according to Example 28 and Example 29 were prepared as with Example 1, except that the thickness of the surface layer was 1.5 μm or 98.8 μm.

Example 30

A developer carrying member according to Example 30 was prepared as with Example 12, except that the thickness of the surface layer was 1.8 μm.

Example 31

A developer carrying member according to Example 31 was prepared as with Example 20, except that the thickness of the surface layer was 92.1 μm.

Example 32

A developer carrying member according to Example 32 was prepared as with Example 20, except that the elastic roller K-2 was used instead of the elastic roller K-1.

Example 33

The same material as the material for forming a surface layer according to Example 1 was prepared. The material was adjusted by MEK such that the total solid content ratio was 30 mass %. Glass beads having a diameter of 1 mm were used as media particles, and the material was dispersed at a circumferential velocity of 14 m/s, a flow rate of 50 ml/s, and a feed amount of 2 kg for 2 hours by using a disperser (Product Name: STARMILL LMZ06; manufactured by Ashizawa Finetech Ltd.). The dispersion was ended, and then, the coating material was taken out from the disperser, and MEK was added such that the solid content concentration was 25 mass %, and thus, a coating material for forming a surface layer was prepared.

A developer carrying member according to Example 33 was prepared as with Example 1, except that the coating material was used, and the thickness of the elastic layer was 300 μm.

Example 34

A coating material for forming a surface layer according to Example 34 was prepared as with the preparation method of the coating material for forming a surface layer according to Example 1, except that carbon black was not used as the material for forming a surface layer. A developer carrying member according to Example 34 was prepared as with Example 1, except that the coating material for forming a surface layer was used.

Example 35

A coating material for forming a surface layer according to Example 35 was prepared as with the coating material for forming a surface layer according to Example 1, except that the dispersion using the sand mill was not performed, but the material for forming a surface layer was dispersed by rotating a rotary rack, as the preparation method of the coating material for forming a surface layer. A developer carrying member was prepared as with Example 1, except that the coating material for forming a surface layer was used.

Comparative Example 9 and Comparative Example 10

Developer carrying members according to Comparative Example 9 and Comparative Example 10 were prepared as with Example 1, except that the thickness of the surface layer was 0.8 μm or 110.2 μm.

Comparative Example 11

A developer carrying member according to Comparative Example 11 was prepared as with Example 12, except that the thickness of the surface layer was 0.8 μm.

Comparative Example 12

A developer carrying member according to Comparative Example 12 was prepared as with Example 20, except that the thickness of the surface layer was 97.4 μm.

Comparative Example 13

A developer carrying member according to Comparative Example 13 was prepared as with Example 20, except that the elastic roller K-3 was used instead of the elastic roller K-1.

Comparative Example 14

A developer carrying member according to Comparative Example 14 was prepared as with Example 12, except that the elastic roller K-4 was used instead of the elastic roller K-1, and the thickness of the surface layer was 1.7 μm.

Comparative Example 15

A coating material for forming a surface layer according to Comparative Example 15 was prepared as with the preparation method of the coating material for forming a surface layer according to Example 20, except that carbon black was not used as the material for forming a surface layer. A developer carrying member according to Comparative Example 15 was prepared as with Example 20, except that the coating material for forming a surface layer was used.

Examples 36 to 37 and Comparative Examples 16 to 18

<Preparation of Polyester>
<<Preparation of Aromatic Polyester A>>

0.6 mol of ethylene glycol, 0.25 mol of propylene glycol, 0.2 mol of neopentyl glycol, 0.6 mol of a dimethyl terephthalic acid, 0.39 mol of an isophthalic acid, 0.009 mol of a fumaric acid, and 0.2 g of tetrapropyl titanate were put into a 5-liter four-neck flask formed of glass. The four-neck flask was provided with a thermometer, a stirring rod, and a condenser, and the four-neck flask was placed in a mantle heater. The temperature was gradually increased to 200° C. while stirring was performed, and a reaction was performed for 4 hours, and thus, an unsaturated polyester resin having Mw of 8800 was obtained as aromatic polyester A.

<<Preparation of Non-Aromatic Polyester B>>

0.86 mol of a fumaric acid, 0.2 mol of neopentyl glycol, 0.9 mol of a succinic acid, 1.7 mol of polyoxypropylene (2.2)-2,2-bis(4-hydroxy phenyl) propane, and 0.2 g of dibutyl tin oxide were put into a 5-liter four-neck flask formed of glass. The four-neck flask was provided with a thermometer, a stirring rod, and a condenser, and the four-neck flask was placed in a mantle heater. The temperature was gradually increased to 200° C. while stirring was performed, and a reaction was performed for 8 hours, and thus, an unsaturated polyester resin having Mw of 11000 was obtained as non-aromatic polyester B.

<<Preparation of Styrene-Acryl-Based Copolymer C>>

The following materials were mixed, a reaction was performed at 140° C. for 3.5 hours in a nitrogen atmosphere, under an ordinary pressure, and then, retention was performed at 180° C. for 2.0 hours, and thus, desolvation was performed, and a styrene-acryl copolymer C was obtained. Mw was 3800, and Tg was 52° C.

Styrene: 96 parts by mass
n-Butyl Acrylate: 4 parts by mass
Trimethylol propane Tris(3-Mercapto Propionate) [manufactured by SAKAI CHEMICAL INDUSTRY CO., LTD.] (($\beta$-Mercaptopropionic Acids): 0.05 parts by mass
Xylene: 500 parts by mass
PERBUTYL D: 10 parts by mass <Preparation of Developer Carrying Member According to Example 36>

100.0 parts by mass of aromatic polyester A described above and 10.0 parts by mass of carbon black (Product Name: MA-230, manufactured by Mitsubishi Chemical Corporation) were mixed, and MEK was added thereto, and thus, the total solid content concentration was adjusted to 30 mass %. Glass beads having a diameter of 1 mm were used as media particles, and the material was dispersed by using a disperser (Product Name: STARMILL LMZ06; manufactured by Ashizawa Finetech Ltd.) at a circumferential velocity of 14 m/s, a flow rate of 50 ml/s, and a feed amount of 2 kg for 10 hours. The dispersion was ended, and then, the coating material was taken out, and MEK was added such that the solid content concentration was 25 mass %, and thus, a coating material for forming a surface layer was obtained. A developer carrying member according to Example 36 was prepared as with Example 1 except that the coating material was used.

<Preparation of Developer Carrying Member According to Example 37>

A coating material for forming a surface layer was prepared as with Example 36, except that carbon black was not used. A developer carrying member according to Example 37 was prepared as with Example 1, except that the coating material was used.

<Preparation of Developer Carrying Member According to Comparative Example 16>

A coating material for forming a surface layer according to Comparative Example 16 was prepared as with the coating material for forming a surface layer according to Example 36, except that the dispersion using the sand mill was not performed, but the material for forming a surface layer was dispersed by rotating a rotary rack, as the preparation method of the coating material for forming a surface layer. A developer carrying member according to Comparative Example 16 was prepared as with Example 36, except that the coating material for forming a surface layer was used.

<Preparation of Developer Carrying Member According to Comparative Example 17>

A coating material for forming a surface layer was prepared as with Example 36, except that the aromatic polyester resin A was changed to a non-aromatic polyester resin B. A developer carrying member according to Comparative Example 17 was prepared as with Example 1, except that the coating material was used.

<Preparation of Developer Carrying Member According to Comparative Example 18>

A coating material for forming a surface layer was prepared as with Example 36, except that the aromatic polyester resin A was changed to a styrene-acryl copolymer C. A developer carrying member according to Comparative Example 18 was prepared as with Example 1, except that the coating material was used.

<Evaluation I>

The following evaluations were performed with respect to the developer carrying members according to Examples 1 to 37 and Comparative Examples 1 to 18.

[Evaluation I-1; Measurement Method of Surface Layer Film Thickness]

The film thickness of the surface layer was observed by using a microscope VHX-600 (Product Name: manufactured by KEYENCE CORPORATION). In the measurement method, the developer carrying member was cut into the shape of a circular arc by a cutter, and the sectional surface was randomly observed in 10 portions at a magnification of 2000 times. The film thickness of the surface layer in each of the observed images was measured in three portions of the center portion and both ends, and the average of the total of 30 portions was set to the film thickness of the surface layer of the developer carrying member.

[Evaluation I-2; Measurement Method of Martens Hardness]

The Martens hardness was measured by using a surface film physical property tester (Product Name: PICODENTOR HM500, manufactured by FISCHER INSTRUMENTS K.K.), on the basis of ISO 14577. An additive average value in which 10 portions that were arbitrarily selected from the center portion in a longitudinal direction of the surface of the developer carrying member were set to a measurement point, and a Martens hardness of a portion without particles in each of the measurement points was measured was set to a measured value of the developer carrying member. A measurement condition is as follows.

Measurement Indenter: a quadrangular pyramid indenter (an angle of 136° and a Bercovici type indenter)
Indenter Material: diamond
Measurement Environment: a temperature of 23° C. and relative humidity of 50%
Load Velocity and Unloading Velocity: 1 mN/50 seconds
Maximum Indentation Load: 1 mN In this evaluation, a load was applied at the velocity described in the above condition by being abutted on the portion without particles on the surface of the developer carrying member, and thus, a load-hardness curve was measured, and a Martens hardness at a time point of reaching an indentation depth of 0.1 μm was calculated by Calculation Expression (2) described below.

Martens Hardness HM (N/mm$^2$)=$F$ (N)/Surface Area (mm$^2$) of Indenter under Test Load Calculation Expression (2):

[Evaluation I-3; Measurement Method of Asker C Hardness]

The Asker C hardness was measured by using a hardness measurement device (Product Name: an Asker C type hardness meter, manufactured by KOBUNSHI KEIKI CO., LTD.), on the basis of JIS K7312 and JIS S6050. The hardness was measured at the total of 9 points in a lunar direction in three portions positioned in a portion where a rubber portion of the roller was quartered in a longitudinal direction, and the additive average value thereof was set to the Asker C hardness. A measurement condition was as follows.

(a) Leaving Condition: perform leaving for 12 hours or longer in an environment of a temperature of 23° C. and relative humidity of 55%

(b) Measurement Environment: perform measurement in an environment of a temperature of 23° C. and relative humidity of 55%

(c) Measurement Load: 10 N (d) Value Reading Time: a value after 30 seconds after a sample contact

[Evaluation I-4; Measurement Method of Work Function]

A slope γ was measured by using a photoelectron spectroscopic apparatus (Product Name: AC-2, manufactured by RIKEN KEIKI Co., Ltd.), in the following condition.

Irradiation Energy: 4.2 eV to 6.2 eV

Light Amount: 300 nW

Counting Time: 10 seconds

Plate Voltage: 2900 V

Raise: 0.5

In a work function measurement curve obtained by being measured in the condition described above, a horizontal axis represents excitation energy, and a vertical axis represents a value Y of 0.5th power of the number of emitted photoelectrons (a standardized quantum yield).

In general, in a case where an excitation energy value exceeds a certain threshold value, the emission of the photoelectrons, that is, the standardized quantum yield rapidly increases, and the work function measurement curve rapidly rises up. At this time, a base line (a straight line) of the standardized quantum yield is set to G, and a straight line obtained by performing linear approximation with respect to a curve after the work function measurement curve rapidly rises up is set to L. The γ value used in the present disclosure was defined as a difference in the slopes between the straight line G and the straight line L. Note that, in the present disclosure, the γ value of the developer carrying member was set to the work function.

[Evaluation I-5; Measurement Method of Area Ratio of Carbon Black (CB) with Respect to Unit Area (40 μm²)]

An observation image of the surface of the developer carrying member was acquired by an ultrahigh-resolution scanning electron microscope (Product Name: ULTRA plus; manufactured by Carl Zeiss Co., Ltd.), in the following condition.

Observation Condition: an acceleration voltage of 1 kV, WD of 3.5 mm, and a magnification of 15000 times;

The acquisition of images of the total six portions of three portions in which the elastic layer was quartered in a longitudinal direction, and three portions rotated by 90°.

The following analysis was performed with respect to each of the acquired images, and thus, a carbon black area ratio was calculated.

Image Analysis:

Binarization was performed by using open source image processing software "ImageJ", in accordance with an Otsu method, and an area ratio of carbon black was calculated by an image analysis apparatus (Product Name: LUZEX AP; manufactured by NIRECO CORPORATION). Note that, in each of six acquired images, the area ratio of carbon black was calculated, and an arithmetic average value thereof was set to the area ratio of carbon black of the surface of the developer carrying member.

The results of performing Evaluation I-1 to Evaluation I-5 described above with respect to the developer carrying members according to Example 1 to 37 and Comparative Examples 1 to 18 are shown in Table 11 and Table 12.

TABLE 11

| | | Thickness of elastic layer (μm) | Thickness of surface layer (μm) | Martens hardness (N/mm²) | Work function (eV) | Asker C hardness (°) | CB exposure amount (%) |
|---|---|---|---|---|---|---|---|
| Examples | 1 | 700 | 15.0 | 79.9 | 5.7 | 78.2 | 8.1 |
| | 2 | 700 | 15.0 | 80.1 | 5.7 | 77.9 | 8.0 |
| | 3 | 700 | 15.0 | 80.3 | 5.7 | 77.6 | 7.7 |
| | 4 | 700 | 15.0 | 80.1 | 5.7 | 78.0 | 7.5 |
| | 5 | 700 | 15.0 | 80.0 | 5.7 | 78.1 | 8.3 |
| | 6 | 700 | 15.0 | 79.8 | 5.7 | 77.9 | 8.3 |
| | 7 | 700 | 15.0 | 80.2 | 5.7 | 78.4 | 8.0 |
| | 8 | 700 | 15.0 | 80.2 | 5.7 | 78.2 | 8.2 |
| | 9 | 700 | 15.0 | 80.1 | 5.7 | 78.0 | 8.1 |
| | 10 | 700 | 15.0 | 80.2 | 5.7 | 78.2 | 8.0 |
| | 11 | 700 | 15.0 | 80.4 | 5.7 | 78.3 | 8.0 |
| | 12 | 700 | 15.0 | 79.6 | 5.7 | 77.5 | 7.8 |
| | 13 | 700 | 15.0 | 81.5 | 5.7 | 77.8 | 8.2 |
| | 14 | 700 | 15.0 | 80.6 | 5.7 | 77.9 | 8.1 |
| | 15 | 700 | 15.0 | 81.0 | 5.7 | 78.2 | 8.4 |
| | 16 | 700 | 15.0 | 80.9 | 5.7 | 77.7 | 8.1 |
| | 17 | 700 | 15.0 | 80.6 | 5.7 | 78.1 | 8.4 |
| | 18 | 700 | 15.0 | 80.8 | 5.7 | 78.0 | 7.8 |
| | 19 | 700 | 15.0 | 80.8 | 5.7 | 78.0 | 7.9 |
| | 20 | 700 | 15.0 | 81.7 | 5.7 | 78.4 | 8.0 |
| | 21 | 700 | 15.0 | 80.2 | 5.7 | 77.8 | 8.3 |
| | 22 | 700 | 15.0 | 81.0 | 5.7 | 78.3 | 8.1 |
| | 23 | 700 | 15.0 | 80.3 | 5.7 | 78.1 | 8.0 |
| | 24 | 700 | 15.0 | 80.9 | 5.7 | 78.1 | 7.8 |
| | 25 | 700 | 15.0 | 80.4 | 5.7 | 78.3 | 7.7 |
| | 26 | 700 | 15.0 | 80.6 | 5.7 | 78.0 | 7.9 |
| | 27 | 700 | 15.0 | 80.3 | 5.7 | 78.2 | 8.2 |
| | 28 | 700 | 1.5 | 59.6 | 5.7 | 75.8 | 8.5 |
| | 29 | 700 | 98.8 | 83.0 | 5.7 | 79.2 | 8.7 |
| | 30 | 700 | 1.8 | 56.3 | 5.7 | 75.2 | 8.8 |
| | 31 | 700 | 92.1 | 93.4 | 5.7 | 80.1 | 8.4 |
| | 32 | 300 | 15.0 | 92.7 | 5.7 | 89.2 | 8.4 |
| | 33 | 700 | 15.0 | 80.3 | 6.0 | 78.2 | 7.3 |
| | 34 | 700 | 15.0 | 72.5 | 5.8 | 77.9 | 0.0 |
| | 35 | 700 | 15.0 | 80.1 | 5.6 | 78.2 | 12.5 |
| | 36 | 700 | 15.0 | 57.8 | 5.7 | 77.1 | 13.4 |
| | 37 | 700 | 15.0 | 51.3 | 5.8 | 75.9 | 0.0 |

TABLE 12

| | | Thickness of elastic layer (μm) | Thickness of surface layer (μm) | Martens hardness (N/mm²) | Work function (eV) | Asker C hardness (°) | CB exposure amount (%) |
|---|---|---|---|---|---|---|---|
| Comparative Examples | 1 | 700 | 15.0 | 48.5 | 5.4 | 77.7 | 8.3 |
| | 2 | 700 | 15.0 | 40.3 | 5.3 | 78.2 | 7.9 |
| | 3 | 700 | 15.0 | 42.0 | 5.5 | 78.1 | 7.9 |
| | 4 | 700 | 15.0 | 45.6 | 5.4 | 78.1 | 8.0 |
| | 5 | 700 | 15.0 | 41.0 | 5.4 | 78.2 | 8.3 |
| | 6 | 700 | 15.0 | 40.2 | 5.4 | 77.9 | 7.8 |
| | 7 | 700 | 15.0 | 37.1 | 5.4 | 77.8 | 7.9 |
| | 8 | 700 | 15.0 | 35.9 | 5.4 | 78.1 | 8.2 |
| | 9 | 700 | 0.8 | 45.7 | 5.7 | 75.1 | 8.6 |
| | 10 | 700 | 110.2 | 103.4 | 5.7 | 76.5 | 8.4 |
| | 11 | 700 | 1.1 | 47.5 | 5.7 | 77.9 | 8.2 |
| | 12 | 700 | 97.4 | 105.9 | 5.7 | 78.8 | 8.5 |
| | 13 | 200 | 15.0 | 95.8 | 5.7 | 92.2 | 8.3 |
| | 14 | 1000 | 1.7 | 50.2 | 5.7 | 72.5 | 8.5 |
| | 15 | 700 | 15.0 | 80.6 | 6.1 | 78.8 | 6.7 |
| | 16 | 700 | 15.0 | 56.2 | 5.4 | 77.4 | 17.8 |
| | 17 | 700 | 15.0 | 58.1 | 5.3 | 75.9 | 18.9 |
| | 18 | 700 | 15.0 | 25.8 | 5.2 | 73.5 | 19.8 |

<Evaluation II>

Analysis was performed with respect to the surface layer of the developer carrying members according to Examples 1 to 27 and Comparative Examples 1 to 8 at a pyrolysis temperature of 590° C., by using helium as carrier gas, with a pyrolysis apparatus (Product Name: Pyrofoil Sampler JPS-700, manufactured by Japan Analytical Industry Co., Ltd.) and a GC/MS apparatus (Product Name: Focus GC/ISQ, manufactured by Thermo Fisher Scientific K.K.).

As a result thereof, it was ascertained that the urethane resin in the surface layer of the developer carrying members according to Examples 1 to 21 and 23 to 27 has the partial structure represented by Structural Formula (3), from a fragment peak that was obtained. In addition, the carbonate bond concentration in the urethane resin was quantified as follows.

First, element analysis is performed, and the content of carbon atoms contained in the urethane resin is obtained. Next, narrow scan analysis of an X ray photoelectron spectroscopic method (XPS) is performed, the ratio of carbonate bonds in the bonds of C1s is analyzed. From the result of the element analysis and the XPS, the carbonate bond concentration in the urethane resin was calculated.

Further, the amount of nitrogen atoms of tertiary amine derived from the amino compound in the urethane resin in the surface layer was quantified by pyrolysis GC/MS and an infrared spectroscopic method (IR).

The results of Evaluation II described above with respect to the developer carrying members according to Examples 1 to 27 and Comparative Examples 1 to 18 are shown in Table 13 and Table 14.

Note that, the carbonate bond concentration (mass %) in the urethane resin can also be calculated from the carbonate bond concentration (mass %) of the isocyanate group-terminated prepolymer shown in Table 5, and a mixing ratio with respect to the amino compound shown in Tables 9 and 10.

In addition, the tertiary amine nitrogen concentration (mass %) in the urethane resin in Tables 13 to 14 was obtained from the measured value that was obtained by the method described above (the pyrolysis GC/MS).

<Evaluation III>
[Evaluation III-1; Triboelectric Charge Quantity of Developer Carrying Member]

The developer carrying member was left to stand for 12 hours in an environment of a temperature of 32.5° C. and relative humidity of 85% (hereinafter, H/H), and then, the triboelectric charge quantity of the developer carrying member was measured in the H/H environment, in accordance with the following procedure.

Figure 4:
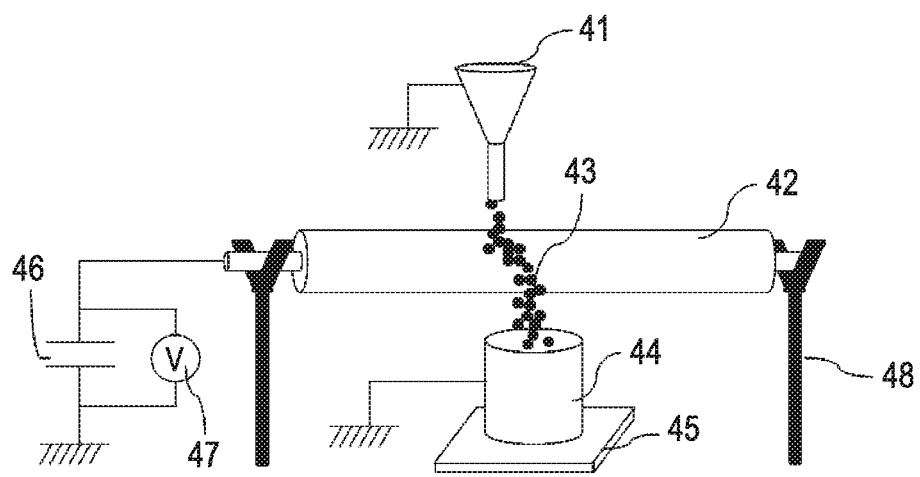
FIG. 4 is a schematic configuration diagram of a measurement device that measures a triboelectric charge quantity of the developer carrying member of the present disclosure.

A measurement unit illustrated in FIG. 4 was used in the measurement by being connected to a gasket type surface charge quantity measurement device TS-100AT (Product Name, manufactured by KYOCERA Chemical Corporation). As illustrated in FIG. 4, a developer carrying member 42 was statically fixed to an insulating support rod 48 not to be rotated, and a carrier 43 was put into a powder inlet 41 and was dropped for 10 seconds, and thus, contact charging was caused in the carrier 43. A standard carrier N-01 (The Imaging Society of Japan) was used as the carrier. The total charge quantity of the carrier 43 dropped into a tray 44 provided on an insulating plate 45 was measured by an electrometer 47 that was connected to a condenser 46 in parallel, and was set to a charge quantity Q [μC]. Further, the mass (g) of the carrier dropped into the tray 44 was measured, and from the value thereof, a charge quantity Q/M (μC/g) per unit mass was set to the triboelectric charge quantity.

[Evaluation III-2; Evaluation of Electric Charge of Talc]

A phenomenon in which the developer carrying member leaked an electric charge of talc that was excessively charged, and the electric charge of talc was attenuated was evaluated by the following method. First, a toner of a cartridge 17A for a laser printer (manufactured by Hewlett-Packard Company) was removed, and instead, the cartridge was filled with 100 g of a talc powder (Product Name: SG-95, manufactured by NIPPON TALC Co., Ltd.). Further, the developer carrying member of the cartridge was replaced with the developer carrying members according to the examples. Next, the cartridge was mounted on a laser printer (Product Name: HP LaserJet Pro M102w Printer, manufactured by Hewlett-Packard Company).

Next, the laser printer was left to stand for 12 hours of longer after being provided in the H/H environment. In the H/H environment, the cartridge was idly rotated for 3 minutes in the laser printer without performing printing with respect to a sheet. The cartridge was taken out immediately after the idle rotation was ended, a surface potential on the developer carrying member coated with talc (talc electric charge attenuation (V)) was measured by a high-accuracy surface electrometer (Product Name: Surface Electrometer MODEL344, manufactured by TREK, INC.).

Accordingly, in a case where the electric charge of talc is attenuated by the developer carrying member (in a case where the electric charge attenuation of talc is fast), an absolute value of the surface potential is measured small, and in a case where the electric charge of talc is not attenuated (in a case where the electric charge attenuation of talc is slow), the absolute value of the surface potential is measured large.

[Evaluation III-3; Evaluation of Talc Derived Fogging Image]

The developer carrying member as an evaluation target was mounted on a laser printer (Product Name: HP LaserJet Pro M102w Printer, manufactured by Hewlett-Packard Company), and the talc derived fogging was evaluated. First, the laser printer on which developer carrying member that was the evaluation target was mounted was left to stand for 12 hours after being provided in the H/H environment.

Next, a black image having a printing rate of 1% was output with respect to a predetermined number of talc-containing sheets (Product Name: Century Star Paper, manufactured by Century Pulp And Paper Limited), for 1000 sheets in a row. At this time, a reflection rate on an end portion of the 1000-th image was measured by a reflection densitometer (Product Name: TC-6DS/A; manufactured by Tokyo Denshoku CO., LTD.).

A decrease amount (%) of the reflection rate based on a sheet that was not printed was measured, and was set to a talc derived fogging value.

The results of Evaluation III-1 to Evaluation III-3 with respect to the developer carrying members according to Examples 1 to 37 and Comparative Examples 1 to 18 are shown in Table 13 to Table 16.

TABLE 13

| | | Isocyanate group-terminated prepolymer | | | Amino compound | | Carbonate bond concentration (mass %) | Tertiary amine nitrogen concentration (mass %) | Evaluation result | | |
|---|---|---|---|---|---|---|---|---|---|---|---|
| | | | | | | | | | Triboelectric charge quantity (Q/M) | Talc electric change attenuation (V) | Talc sheet fogging (%) |
| | No. | Structural formula to be included | Structure contained in molecules | Copolymerization ratio | No. | Functional group | | | | | |
| Example 1 | A-1 | (2) | R21 = —(CH2)6— | R22 = —(CH2)5— | p/k = 1.65 | D-1 | —OH | 17.5 | 1.3 | -4.8 | -1.2 | 1.1 |
| Example 2 | A-2 | (2) | R21 = —(CH2)6— | R22 = —(CH2)6— | p/k = 1.65 | D-2 | —OH | 17.2 | 1.4 | -4.3 | -1.2 | 1.0 |
| Example 3 | A-3 | (2) | R21 = —(CH2)6— | R22 = —(CH2)5— | p/k = 1.65 | D-2 | —OH | 19.9 | 1.1 | -4.3 | -1.1 | 1.2 |
| Example 4 | A-4 | (2) | R21 = —(CH2)6— | R22 = —(CH2)5— | p/k = 1.65 | D-3 | —OH | 18.8 | 1.2 | -3.9 | -1.1 | 1.0 |
| Example 5 | A-5 | (2) | R21 = —(CH2)6— | R22 = —(CH2)8— | p/k = 1.55 | D-4 | —OH | 19.9 | 2.1 | -5.3 | -0.9 | 1.1 |
| Example 6 | A-6 | (2) | R21 = —(CH2)4— | R22 = —(CH2)8— | p/k = 1.9 | D-5 | —OH | 18.9 | 1.8 | -4.4 | -2.5 | 2.8 |
| Example 7 | A-7 | (2) | R21 = —(CH2)3— | R22 = —(CH2)3— | p/k = 2.2 | D-6 | —OH | 15.7 | 2.4 | -5.7 | -2.4 | 2.8 |
| Example 8 | A-8 | (2) | R21 = —(CH2)4— | R22 = —(CH2)6— | p/k = 1.4 | D-7 | —OH | 16.7 | 2.9 | -6.5 | -1.3 | 1.6 |
| Example 9 | A-9 | (1) | R11 = —(CH2)6— | | | D-7 | —OH | 19.8 | 3.4 | -7.2 | -4.4 | 5.6 |
| Example 10 | A-10 | (1) | R11 = —(CH2)6— | | | D-2 | —OH | 19.3 | 2.7 | -6.7 | -3.5 | 3.1 |
| Example 11 | A-11 | (1) | R11 = —(CH2)6— | | | D-2 | —OH | 22.8 | 0.8 | -3.1 | -4.4 | 5.8 |
| Example 12 | A-12 | (1) | R11 = —(CH2)6— | | | D-3 | —OH | 12.6 | 2.2 | -5.1 | -6.2 | 5.6 |
| Example 13 | A-13 | (1) | R11 = —(CH2)6— | | | D-3 | —OH | 26.7 | 1.0 | -4.2 | -1.8 | 5.4 |
| Example 14 | A-14 | (6) | R61 = —(CH2)6— | R62 = —(CH2)5— | r/s = 1.00 | D-8 | —OH | 22.8 | 2.9 | -6.1 | -4.1 | 3.1 |
| Example 15 | A-15 | (1) | R11 =  —CH2— | | | D-4 | —OH | 19.1 | 1.5 | -4.6 | -4.2 | 3.5 |
| Example 16 | A-16 | (6) | R61 = —(CH2)2—CHCH3—(CH2)2— | R62 = —(CH2)6— | r/s = 9.00 | D-9 | —OH | 22.0 | 1.4 | -4.3 | -3.7 | 3.2 |
| Example 17 | A-17 | (6) | R61 = —(CH2)2—CHCH3—(CH2)2— | R62 = —(CH2)6— | r/s = 9.00 | D-7 | —OH | 22.1 | 2.9 | -6.2 | -4.1 | 3.1 |
| Example 18 | A-18 | (2) | R21 = —(CH2)6— | R22 = —(CH2)5— | p/k = 1.65 | D-2 | —OH | 16.2 | 3.4 | -7.4 | -1.2 | 2.5 |
| Example 19 | A-19 | (2) | R21 = —(CH2)6— | R22 = —(CH2)3— | p/k = 1.65 | D-10 | —OH | 19.1 | 0.8 | -3.0 | -1.1 | 2.7 |
| Example 20 | A-20 | (2) | R21 = —(CH2)3— | R22 = —(CH2)8— | p/k = 1.75 | D-2 | —OH | 27.5 | 1.5 | -4.4 | -0.4 | 2.6 |
| Example 21 | A-21 | (2) | R21 = —(CH2)8— | R22 = —(CH2)3— | p/k = 1.45 | D-11 | —OH | 12.6 | 2.5 | -6.1 | -3.3 | 2.5 |
| Example 22 | A-22 | (2) | R21 = —(CH2)3— | R22 = —(CH2)5— | p/k = 1.75 | D-2 | —OH | 25.8 | 3.4 | -7.7 | -1.8 | 4.5 |
| Example 23 | A-19 | (2) | R21 = —(CH2)6— | R22 = —(CH2)6— | p/k = 1.65 | D-16 | —OH | 13.8 | 0.7 | -3.0 | -4.6 | 4.4 |
| Example 24 | A-1 | (2) | R21 = —(CH2)6— | R22 = —(CH2)6— | p/k = 1.65 | D-12 | —NH2 | 18.2 | 1.1 | -4.0 | -1.6 | 2.7 |
| Example 25 | A-1 | (2) | R21 = —(CH2)6— | R22 = —(CH2)6— | p/k = 1.65 | D-2 | —NH2 | 16.9 | 1.9 | -4.2 | -1.8 | 2.7 |
| Example 26 | A-1 | (2) | R21 = —(CH2)6— | R22 = —(CH2)6— | p/k = 1.65 | D-13 | —NH2 | 14.5 | 1.8 | -4.1 | -1.9 | 2.6 |
| Example 27 | A-23 | (7) | R71 = 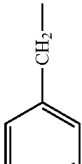 —CH2— | R72 = —(CH2)5— | x/y = 1.65 | D-13 | —NH2 | 16.3 | 1.5 | -4.5 | -2.6 | 7.1 |

TABLE 14

| | No. | Isocyanate group-terminated prepolymer Structural formula to be included | Structure contained in molecules | | Copolymerization ratio | Amino compound or polyol No. | Functional group | Carbonate bond concentration (mass %) | Tertiary amine nitrogen concentration (mass %) | Triboelectric charge quantity (Q/M) | Talc electric charge attenuation (V) | Talc sheet fogging (%) |
|---|---|---|---|---|---|---|---|---|---|---|---|---|
| Comparative Example 1 | A-19 | (2) | R21 = —(CH2)6— | R22 = —(CH2)5— | p/k = 1.65 | D-15 | —OH | 19.1 | 0.0 | −1.8 | −1.5 | 11.7 |
| Comparative Example 2 | A-24 | (2) | R21 = —(CH2)6— | R22 = —(CH2)5— | p/k = 1.65 | D-16 | —OH | 7.0 | 0.0 | −1.9 | −3.5 | 12.7 |
| Comparative Example 3 | A-19 | (2) | R21 = —(CH2)6— | R22 = —(CH2)5— | p/k = 1.65 | D-17 | —OH | 7.5 | 0.0 | −1.9 | −2.7 | 10.4 |
| Comparative Example 4 | A-19 | (2) | R21 = —(CH2)6— | R22 = —(CH2)5— | p/k = 1.65 | D-18 | —OH | 19.2 | 0.0 | −1.8 | −2.9 | 14.1 |
| Comparative Example 5 | A-19 | (2) | R21 = —(CH2)6— | R22 = —(CH2)5— | p/k = 1.65 | D-19 | —OH | 7.5 | 0.0 | −1.6 | −6.2 | 17.6 |
| Comparative Example 6 | A-25 | (8) | R81 = —(CH2)4— | — | — | D-2 | —OH | 0.0 | 1.3 | −2.9 | −17.7 | 19.0 |
| Comparative Example 7 | A-25 | (8) | R81 = —(CH2)4— | — | — | D-15 | —OH | 0.0 | 0.0 | −1.9 | −14.3 | 20.7 |
| Comparative Example 8 | A-25 | (8) | R81 = —(CH2)4— | — | — | D-18 | —OH | 0.0 | 0.0 | −1.6 | −17.8 | 17.9 |

TABLE 15

| | | Thickness of elastic layer (μm) | Thickness of surface layer (μm) | Triboelectric charge quantity (Q/M) | Talc electric charge attenuation (V) | Talc derived fogging (%) |
|---|---|---|---|---|---|---|
| Examples | 28 | 700 | 1.5 | −3.4 | −5.4 | 6.1 |
| | 29 | 700 | 98.8 | −4.3 | −2.1 | 3.1 |
| | 30 | 700 | 1.8 | −3.1 | −6.2 | 7.9 |
| | 31 | 700 | 92.1 | −4.2 | −2.1 | 3.9 |
| | 32 | 700 | 15.0 | −4.5 | −1.8 | 6.5 |
| | 33 | 300 | 15.0 | −3.1 | −2.0 | 6.6 |
| | 34 | 700 | 15.0 | −5.2 | −5.3 | 5.9 |
| | 35 | 700 | 15.0 | −4.5 | −6.7 | 7.5 |
| | 36 | 700 | 15.0 | −3.8 | −3.1 | 6.2 |
| | 37 | 700 | 15.0 | −4.9 | −6.4 | 6.2 |

TABLE 16

| | | Thickness of elastic layer (μm) | Thickness of surface layer (μm) | Triboelectric charge quantity (Q/M) | Talc electric charge attenuation (V) | Talc derived fogging (%) |
|---|---|---|---|---|---|---|
| Comparative Examples | 9 | 700 | 0.8 | −2.9 | −7.2 | 9.6 |
| | 10 | 700 | 110.2 | −4.5 | −1.4 | 9.8 |
| | 11 | 700 | 0.8 | −2.8 | −6.4 | 9.5 |
| | 12 | 700 | 97.4 | −3.7 | −1.5 | 10.0 |
| | 13 | 200 | 15.0 | −3.6 | −1.2 | 9.7 |
| | 14 | 1000 | 1.7 | −2.8 | −10.5 | 9.4 |
| | 15 | 700 | 15.0 | −2.5 | −1.8 | 9.0 |
| | 16 | 700 | 15.0 | −2.7 | −15.6 | 12.8 |
| | 17 | 700 | 15.0 | −2.0 | −17.2 | 14.0 |
| | 18 | 700 | 15.0 | −2.1 | −16.9 | 20.8 |

In Examples 1 to 27, the urethane resin according to the present disclosure is not contained in the surface layer, and thus, the triboelectric charge quantity is large and the talc electric charge attenuation is fast (the talc electric charge attenuation (V) is small). For this reason, an excellent talc derived fogging prevention effect was obtained.

In Examples 1 to 26, the alkyl group is provided around the carbonate bond, and thus, the talc derived fogging prevention effect is particularly excellent, compared to Example 27 in which aromatic series are provided around the carbonate bond.

In addition, in Examples 9 to 17 in which the structure having a polyester bond is not added to the structure having a carbonate bond, in Examples 10 and 14 to 17, the carbonate bond concentration in the urethane resin is 14.0 mass % or more and 23.0 mass % or less, and the concentration of a nitrogen atom of tertiary amine derived from the compound represented by Structural Formula (3) is 1.0% mass % or more and 3.0 mass % or less, and thus, the talc derived fogging prevention effect is particularly excellent. In addition, in Examples 1 to 8 and Examples 24 to 26, the structure represented by Structural Formula (2) is provided between two adjacent urethane bonds in the urethane resin. For this reason, the talc derived fogging prevention effect is particularly excellent.

Further, in Examples 1 to 5, Example 8, and Examples 24 to 26, p and k in Structural Formula (2) are in a range of 1.4 to 1.8, and thus, the talc derived fogging prevention effect is particularly excellent. Among them, in Examples 1 to 5 and Example 8, the compound represented by Structural Formula (3) is the compound represented by Structural Formula (5), and thus, the talc derived fogging prevention effect is particularly excellent.

In Comparative Examples 1 to 8, it is obvious that not only is the level of talc derived fogging poor, from the viewpoint of the charging applying properties, but also the Martens hardness at the indentation amount of 0.1 μm is low, and thus, talc that is attached is less likely to be peeled off, and the talc derived fogging is degraded.

In particular, in Comparative Examples 6 to 8, the urethane resin in the surface layer does not have a carbonate bond in the molecules. For this reason, the value of the work function of the outer surface of the surface layer was less than 5.6. As a result thereof, the electric charge attenuation of talc on the surface of the developer carrying member is not sufficient, and a state is maintained in which talc on the developer carrying member is excessively negatively charged. For this reason, talc is electrostatically attached onto the outer surface of the surface layer, and thus, the value of the talc derived fogging is large.

In addition, from Comparative Examples 10 and 12, the Martens hardness at the indentation amount of 0.1 µm is high, and thus, the deformation of the toner causes a regulation failure, and the triboelectric charge quantity and the talc electric charge attenuation of the developer carrying member are not affected, but the result of the talc derived fogging is degraded. In addition, in Comparative Example 13, the Asker C hardness is high, and thus, as with the Martens hardness, the deformation of the toner is caused, and the result of the talc derived fogging is degraded.

In Comparative Example 15, the work function exceeds 6.0 eV, and thus, negative electric charge applying performance with respect to the toner decreases, and the value of the talc derived fogging increases. In Comparative Examples 16 and 17, the work function is low, and thus, the electric charge attenuation of talc is not sufficient, the electrostatic attachment of talc with respect to the surface of the surface layer is caused, and the value of the talc derived fogging is large. In Comparative Example 18, as with Comparative Examples 16 and 17, the work function is low, and the Martens hardness at the indentation amount of 0.1 µm is low, and thus, the electrostatic attachment and the physical attachment of talc with respect to the surface of the surface layer are caused, and the value of the talc derived fogging is large.

According to one aspect of the present disclosure, it is possible to obtain a developer carrying member that is capable of stably forming a high-definition electrophotographic image with respect to various sheets.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A developer carrying member, comprising:
an electroconductive substrate; and
a surface layer containing a resin on the substrate, wherein
a thickness of the surface layer is 1.0 µm or more and 100.0 µm or less,
a Martens hardness at an indentation depth of 0.1 µm that is measured by infiltrating a Vickers indenter in a thickness direction of the surface layer from an outer surface of the surface layer is 50.0 N/mm² or more and 100.0 N/mm² or less,
an Asker C hardness that is measured from the outer surface of the surface layer is 75° or more and 90° or less, and
a value of a work function of the outer surface of the surface layer is 5.6 eV or more and 6.0 eV or less.

2. The developer carrying member according to claim 1, further comprising:
an elastic layer between the substrate and the surface layer.

3. The developer carrying member according to claim 1, wherein the surface layer contains carbon black.

4. The developer carrying member according to claim 3, wherein an area ratio of the carbon black that is exposed to the outer surface of the surface layer to a unit area (40 µm²) of the outer surface is 10.0% or less.

5. The developer carrying member according to claim 1, wherein the surface layer contains at least one of a urethane resin having a carbonate bond, and an aromatic polyester resin.

6. The developer carrying member according to claim 5, wherein the urethane resin has a structure having a carbonate bond represented by Structural Formula (1):

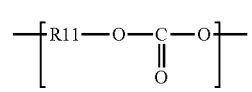

Structural Formula (1)

in Structural Formula (1), R11 is a straight-chain or branched-chain alkylene group having 3 or more and 8 or less carbon atoms, an alkylene group having 4 or more and 8 or less carbon atoms that has an alicyclic hydrocarbon structure having 4 or more and 6 or less carbon atoms, or an alkylene group having 4 or more and 8 or less carbon atoms that has an aromatic hydrocarbon structure having 4 or more and 6 or less carbon atoms.

7. The developer carrying member according to claim 5, wherein the urethane resin has a structure represented by Structural Formula (2) between two adjacent urethane bonds:

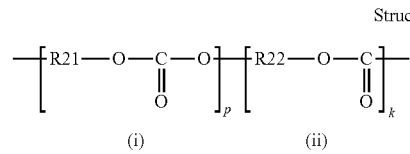

Structural Formula (2)

in Structural Formula (2), R21 represents a straight-chain or branched-chain alkylene group having 3 or more and 8 or less carbon atoms, an alkylene group having 4 or more and 8 or less carbon atoms that has an alicyclic hydrocarbon structure having 4 or more and 6 or less carbon atoms, or an alkylene group having 4 or more and 8 or less carbon atoms that has an aromatic hydrocarbon structure having 4 or more and 6 or less carbon atoms, R22 represents a straight-chain or branched-chain alkylene group having 3 or more and 8 or less carbon atoms, p is an integer of 1 or more, k is an integer of 1 or more, and in a case where p and k are 2 or more, a plurality of R21s and a plurality of R22s are each independently defined as described above.

8. The developer carrying member according to claim 7, wherein p and k in the Structural Formula (2) satisfy a relationship represented by following Expression (I):

$1.4 \leq p/k \leq 1.8.$  Expression (I):

9. The developer carrying member according to claim 5, wherein the urethane resin has a partial structure that is derived from a reaction between a compound represented by Structural Formula (3) and polyisocyanate:

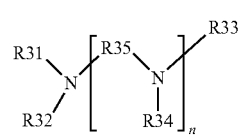

Structural Formula (3)

in Structural Formula (3), R35 represents a straight-chain or branched-chain alkylene group having 2 or more and 4 or less carbon atoms, n is an integer of 1 or more and 4 or less, and in a case where n is 2 or more and 4 or less, a plurality of R35s is each independently defined as described above, R31 to R34 are each independently any one selected from following (a) to (d), and in a case where n is 2 or more and 4 or less, a plurality of R34s is each independently defined as described above, provided that n is 1, all of R31 to R34 are any one selected from following (b) to (d), and provided that n is 2 or more and 4 or less, at least four of R31 to R33 and two to four R34s are any one selected from following (b) to (d):

(a) a hydrogen atom, or a straight-chain or branched-chain alkyl group having 1 to 4 carbon atoms;
(b) a straight-chain or branched-chain hydroxy alkyl group having 1 or more and 8 or less carbon atoms;
(c) a straight-chain or branched-chain aminoalkyl group having 2 or more and 8 or less carbon atoms; and
(d) a group represented by following Structural Formula (4):

Structural Formula (4)

in Structural Formula (4), m is 2 or 3, a plurality of R41s each independently represents a straight-chain or branched-chain alkylene group having 2 or more and 5 or less carbon atoms.

10. The developer carrying member according to claim 9, wherein the compound represented by the Structural Formula (3) is a compound represented by following Structural Formula (5):

Structural Formula (5)

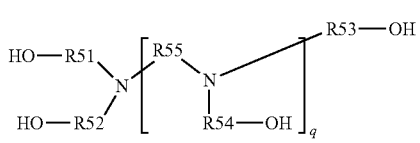

in Structural Formula (5), R55 represents a straight-chain or branched-chain alkylene group having 2 or more and 4 or less carbon atoms, q is an integer of 1 or more and 4 or less, and in a case where q is 2 or more and 4 or less, a plurality of R55s is each independently defined as described above, and R51 to R54 are each independently a straight-chain or branched-chain alkylene group having 2 or more and 5 or less carbon atoms, and in a case where q is 2 or more and 4 or less, a plurality of R54s is each independently defined as described above.

11. The developer carrying member according to claim 9, wherein a concentration of the carbonate bond in the urethane resin is 14.0 mass % or more and 23.0 mass % or less, and a concentration of a nitrogen atom of tertiary amine derived from the compound represented by the Structural Formula (3) in the urethane resin is 1.0 mass % or more and 3.0 mass % or less.

12. A process cartridge configured to be detachably attachable with respect to a main body of an electrophotographic apparatus, the process cartridge comprising at least:
a toner container containing a toner; and
a developer carrying member configured to convey the toner,
wherein the developer carrying member comprises:
an electroconductive substrate; and
a surface layer containing a resin on the substrate, wherein
a thickness of the surface layer is 1.0 µm or more and 100.0 µm or less,
a Martens hardness at an indentation depth of 0.1 µm that is measured by infiltrating a Vickers indenter in a thickness direction of the surface layer from an outer surface of the surface layer is 50.0 N/mm² or more and 100.0 N/mm² or less,
an Asker C hardness that is measured from the outer surface of the surface layer is 75° or more and 90° or less, and
a value of a work function of the outer surface of the surface layer is 5.6 eV or more and 6.0 eV or less.

13. An electrophotographic apparatus, comprising at least:
an electrophotographic photosensitive member;
a charging member disposed to be capable of charging the electrophotographic photosensitive member; and
a developer carrying member configured to supply a toner to the electrophotographic photosensitive member,
wherein the developer carrying member comprises:
an electroconductive substrate; and
a surface layer containing a resin on the substrate, wherein
a thickness of the surface layer is 1.0 µm or more and 100.0 µm or less,
a Martens hardness at an indentation depth of 0.1 µm that is measured by infiltrating a Vickers indenter in a thickness direction of the surface layer from an outer surface of the surface layer is 50.0 N/mm² or more and 100.0 N/mm² or less,
an Asker C hardness that is measured from the outer surface of the surface layer is 75° or more and 90° or less, and
a value of a work function of the outer surface of the surface layer is 5.6 eV or more and 6.0 eV or less.

* * * * *